US012662651B2

United States Patent

(12) United States Patent
Ghosh et al.

(10) Patent No.: US 12,662,651 B2
(45) Date of Patent: Jun. 23, 2026

(54) SOAP COMPOSITION

(71) Applicant: FIRMENICH SA, Satigny (CH)

(72) Inventors: Pabitra Ghosh, Singapore (SG); Jane Tang, Singapore (SG); Aparna Vittal, Singapore (SG); Bhavesh Mandhane, Andheri East (IN)

(73) Assignee: FIRMENICH SA, Satigny (CH)

( * ) Notice: Subject to any disclaimer, the term of this patent is extended or adjusted under 35 U.S.C. 154(b) by 983 days.

(21) Appl. No.: 17/755,497

(22) PCT Filed: Dec. 17, 2020

(86) PCT No.: PCT/EP2020/086818
§ 371 (c)(1),
(2) Date: Apr. 29, 2022

(87) PCT Pub. No.: WO2021/123018
PCT Pub. Date: Jun. 24, 2021

(65) Prior Publication Data

US 2023/0020871 A1 Jan. 19, 2023

(30) Foreign Application Priority Data

Dec. 20, 2019 (SG) .......................... 10201912820Q
Jan. 16, 2020 (EP) .................................... 20152132

(51) Int. Cl.

| | |
|---|---|
| ***C11D 3/02*** | (2006.01) |
| ***B08B 3/04*** | (2006.01) |
| ***C11D 3/50*** | (2006.01) |
| ***C11D 9/12*** | (2006.01) |
| ***C11D 9/16*** | (2006.01) |

(Continued)

(52) U.S. Cl.
CPC ................ *C11D 9/442* (2013.01); *C11D 9/12* (2013.01); *C11D 9/16* (2013.01); *C11D 9/20* (2013.01)

(58) Field of Classification Search
CPC .... C11D 3/02; C11D 3/50; C11D 9/12; C11D 9/20; C11D 9/44; C11D 9/442; B08B 3/04
See application file for complete search history.

(56) References Cited

U.S. PATENT DOCUMENTS

2006/0040848 A1 2/2006 Fehr et al.
2017/0274111 A1 9/2017 Nwachukwu et al.

FOREIGN PATENT DOCUMENTS

JP 2016035059 A 3/2016
JP 2016113606 A 6/2016

(Continued)

OTHER PUBLICATIONS

"2-Propylsulfanyloctan-4-one", Pubchem Compound, National Center for Biotechnology Information, Feb. 13, 2015 (Feb. 13, 2015).

(Continued)

*Primary Examiner* — Brian P Mruk

(57) ABSTRACT

Disclosed herein is a soap composition including a soap active material and a fragrance composition including at least one profragrance compound, where the at least one profragrance compound releases a fragrance compound upon reacting with oxygen. Also disclosed herein is a soap article including the soap composition as well as a method of conferring, improving, enhancing or modifying perfume retention of the fragrance composition over a prolonged period of time in a soap composition.

16 Claims, 1 Drawing Sheet

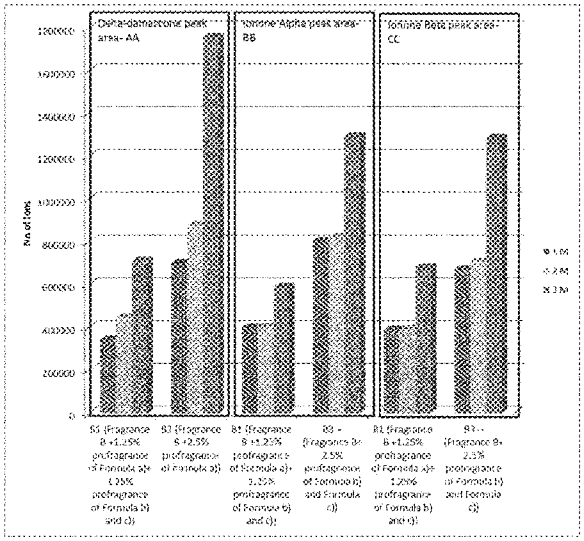

(51) Int. Cl.
*C11D 9/20* (2006.01)
*C11D 9/44* (2006.01)

(56) References Cited

FOREIGN PATENT DOCUMENTS

| | | | | | |
|---|---|---|---|---|---|
| JP | 2017214670 | A | | 12/2017 | |
| WO | 03049666 | A2 | | 6/2003 | |
| WO | WO 03/049666 | | * | 6/2003 | |
| WO | 2014176392 | A1 | | 10/2014 | |
| WO | WO 2014/176392 | | * | 10/2014 | ............. C11D 17/04 |
| WO | 2014202591 | A1 | | 12/2014 | |
| WO | 2018037121 | A1 | | 3/2018 | |
| WO | 2019243369 | A1 | | 12/2019 | |
| WO | WO-2020188079 | A1 | * | 9/2020 | ........... C11B 9/0061 |

OTHER PUBLICATIONS

International Search Report and Written Opinion for corresponding PCT/EP2020/086818 mailed Mar. 18, 2021; 17 pages.

* cited by examiner

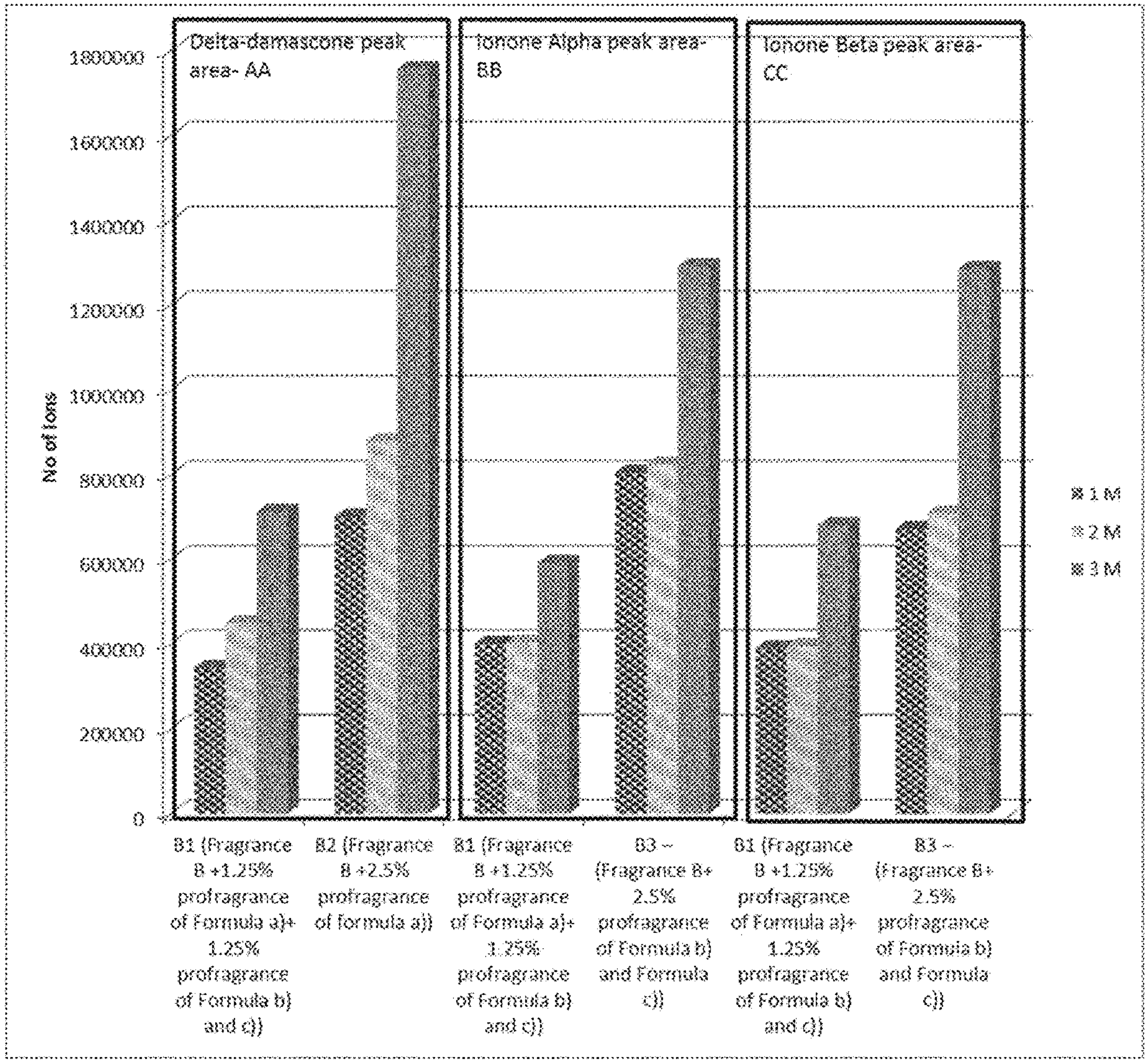

Delta-damascone peak area- AA
Ionone Alpha peak area- BB
Ionone Beta peak area- CC
1800000
1600000
1400000
1200000
1000000
800000
600000
400000
200000
0
No of ions
1 M
2 M
3 M
B1 (Fragrance B +1.25% profragrance of Formula a)+ 1.25% profragrance of Formula b) and c))
B2 (Fragrance B +2.5% profragrance of formula a))
B1 (Fragrance B +1.25% profragrance of Formula a)+ 1.25% profragrance of Formula b) and c))
B3 – (Fragrance B+ 2.5% profragrance of Formula b) and Formula c))
B1 (Fragrance B +1.25% profragrance of Formula a)+ 1.25% profragrance of Formula b) and c))
B3 – (Fragrance B+ 2.5% profragrance of Formula b) and Formula c))

SOAP COMPOSITION

CROSS-REFERENCE TO RELATED APPLICATIONS

This application is a U.S. National Phase Application of International Patent Application No. PCT/EP2020/086818, filed Dec. 17, 2020, which claims the benefit of priority to Singapore Patent Application No. 10201912820Q, filed Dec. 20, 2019, and which claims the benefit of priority to European Patent Application No. 20152132.5, filed Jan. 16, 2020, the entire contents of which are hereby incorporated by reference herein.

TECHNICAL FIELD

The present invention relates to the field of perfumery, more particular it concerns soap compositions. The present invention relates to a soap composition comprising a soap active material and a fragrance composition comprising at least one profragrance compound, wherein the at least one profragrance compound releases a fragrance compound upon reacting with oxygen. The present invention also relates to a soap article comprising the soap composition and the use thereof as well as a method of conferring, improving, enhancing or modifying perfume retention of the fragrance composition over a prolonged period of time in a soap composition.

BACKGROUND OF THE INVENTION

Fragrances play an important role in the perception of products performance and thus they often determine the consumer's choice for a given product.

The early days of fragrance industry, fragrance compositions with ingredients designated as top, middle and base notes are commonly used in personal care compositions and most of the other categories. Top notes are volatile ingredients that lack tenacity on blotters or smelling strips and provide strong performance at initial product application. Middle notes or "modifiers" have intermediate volatility and tenacity on blotters while the heavier base notes provide the long-lasting component. In practice, a problem is that many of the compounds which are "top and middle" notes are volatile. Middle and bottom notes are responsible for fragrance to remain on surfaces such as skin for substantial period of time so that people can experience fragrance long time after bath. A common problem with traditional fragrance ingredients in soap bars is the loss of top and middle notes during storage due to degradation and evaporation, which leaves the soap bar with reduced fragrance impact in comparison to freshly made batches. Actually, the soap composition possesses a PH of >9 representing an aggressive medium for perfuming composition rendering the creation of a robust perfuming composition performing well in soap bar a real challenge for the industry.

So, there is a need to develop a perfuming composition able to perform well during all stages of typical usage cycle of the product and provide a high fragrance intensity, e.g. when using a soap bar, during the blooming, lathering and washing phase, and on the skin after towel drying, while imparting a pleasant odor for a prolonged period of time after use on the skin (which is also mentioned as long lastingness) and also in the wash area.

Moreover, soap bars are made from soap base, which has a typical smell. Normal tallow base provides a synthetic, waxy, creamy, fatty, and animalic note, whereas palm fatty acid-based soap generates an earthy, plastic, burnt and metallic note. This base note deteriorates if a soap bar is stored for a long time, thereby reducing the effect of the fragrance. In particular, some bases develop rancid note in addition to normal base smell. Soap fragrance ingredients have therefore the additional task of covering base odour in addition impart fragrance experience. Therefore, it is highly desirable to use some combination of ingredients, which releases fragrance slowly for the entire life cycle of the product to enhance the benefit at each point during usage while being stable in soap.

U.S. Pat. No. 6,336,553 B1 describes that soap bars can be effectively packaged in substantially transparent materials so that the soap bar can be seen through the packaging material, which provides a low fragrance loss.

US20050003975 A1 describes perfume compositions comprising defined high impact accords and personal cleansing compositions, especially soap bars, comprising those perfume compositions are provided. In a preferred aspect, the perfume compositions are encapsulated in starch or the like so as to release fragrance when exposed to water, such as in the shower.

WO 2016/135193 mentions a perfuming composition comprising a β-thio carbonyl profragrance derivative.

WO 03/049666 describes compounds for a controlled release of active molecules and mentions compounds comprising at least one β-oxy or β-thio carbonyl moiety capable of liberating an active molecule such as, for example, an α,β-unsaturated ketone, aldehyde or carboxylic ester.

However, the mentioned applications do not disclose or suggest the advantageous use of certain profragrances in soap compositions or soap articles, wherein the article changes the stages or phases from solid, liquid, gaseous or lathering phases such as in a soap composition according to the present invention. Moreover, certain profragrances in perfumed soap compositions have long lasting effects in different stages of use in such soap compositions.

There is a need to provide soap compositions that can impart a variety of olfactive impressions on the user at different point of usage. The aim of the present invention is therefore to provide a soap composition, which releases a fragrance over prolonged period of time for a noticeable change in the odor profile at different point of usage. Additionally, an aim is to provide a soap composition or a soap article having an air freshening effect over a prolonged period of time. Moreover, a further aim is to improve stability for the fragrance compounds, in particular in soap compositions, and/or additional control on the kinetics of the fragrance release of the profragrance compounds upon application.

DESCRIPTION OF THE INVENTION

The present invention addresses these needs and provides a soap composition that can impart a variety of impressions on the user at different point of usage. Moreover, such soap composition releases a fragrance over prolonged period of time and has an air freshening effect.

According to the first aspect, the present invention relates to a soap composition comprising

- a soap active material and
- a fragrance composition comprising at least one profragrance compound.

According to one embodiment, the present invention relates to a soap composition comprising a soap active material and a fragrance composition comprising at least one profragrance compound, wherein the at least one profragrance compound releases a fragrance compound upon reacting with oxygen.

This soap composition provides several advantages: the use of profragrances improves the stability of the fragrance compounds during storage. Moreover, profragrances, which react with oxygen continuously, permits the release of the fragrance compound derived from the profragrance over a prolonged period of time and in consequence the soap composition or the soap bar has a prolonged air freshening effect. Additionally, the advantageous use of oxygen as reactant permits the speed up of the release reactions of the fragrance in certain situations of usage of such a soap composition and this in turn impart a variety of impressions on the user during different point of usage. Therefore, the soap composition of the invention provides a high fragrance intensity during all stages of typical usage cycle of the product and keep the odour more intense in a neat, dry bar, and in use phase such as the washing, blooming and lathering phase. Moreover, also the odour on the skin after towel drying as well as in the wash area is more intense for a prolonged period of time. A further advantage of a soap bar of the invention is the long-lasting air freshening effect, when the soap bar is used normally in room such as a toilet room.

In a second aspect, the present invention relates to soap article comprising a soap composition as defined above, wherein the soap article may be in the form of a liquid cleanser, toilet bar, laundry bar, preferably a soap-based or syndet-based laundry bar, shaving composition, personal cleansing composition, body care product, perfume, shampoo, preferably a shower gel, preferably a soap-based shower gel or syndet-based shower gel, more preferably a syndet-based soap bar, or most preferably a soap bar.

In a third aspect, the present invention relates to the use of the soap composition or the soap article to confer, improve, enhance or modify the fragrance intensity of the fragrance composition on a skin, surface or in the air surrounding of the skin, the surface or the soap article over a prolonged period of time, preferably over a period of time of 48 hours, preferably 24 hours, more preferably 18 hours, even more preferably 12 hours, most preferably 10 or 8 hours under ambient conditions.

In a fourth aspect, the present invention relates to a method for conferring, improving, enhancing or modifying fragrance intensity of the fragrance composition on a skin, surface or in the air surrounding of the skin, the surface or the soap article over a prolonged period of time, preferably over a period of time of time of 48 hours, preferably 24 hours, more preferably 18 hours more preferably 18 hours, even more preferably 12 hours, most preferably 10 or 8 hours under ambient conditions, wherein the method comprises the step of applying soap composition of the present invention or the soap article of the present invention to a skin, surface or air.

In another aspect, the present invention relates to the use of a profragrance as herein defined to confer, improve, enhance or modify perfume retention of the fragrance composition in a soap composition or soap article during storage over a prolonged period of time, preferably over a period of time of 18 months, preferably 12 months, more preferably 3 months.

In a further aspect, the present invention relates to a method of conferring, improving, enhancing or modifying perfume retention of the fragrance composition over a prolonged period of time, preferably over a period of time of 18 months, preferably 12 months, more preferably 3 months, in a soap composition or soap article during storage, wherein the method comprises the step of incorporating a profragrance as herein defined in a soap composition or a soap article.

BRIEF DESCRIPTION OF THE DRAWING

FIG. 1: Bar chart of the analytical data of the release of delta-damascone, alpha-ionone and beta-ionone. The increase in the number of ions of Delta-damascone, alpha-ionone, beta-ionone in a Head-Space Solid-Phase Micro-Extraction (HS-SPME) from grated surface of a soap bar, after storage of the soap bar at 45° C. for 1 month, 2 months and 3 months in comparison to a control without formula a) or formula b) and c) (represented by peak area). The FIGURE shows the release of the compounds at the time of analysis.

DETAILED DESCRIPTION OF THE INVENTION

The inventors have invented a soap composition and soap articles, which releases a fragrance in certain situations of usage of such a soap composition or article and this in turn impart a variety of impressions on the user during different point of usage. Moreover, the soap compositions and soap articles such as soap bars impart an improved freshening effect.

Although the present invention will be described with respect to particular embodiments, this description is not to be construed in a limiting sense.

Before describing in detail exemplary embodiments of the present invention, definitions important for understanding the present invention are given.

In the context of the present invention, the terms "about" and "approximately" denote an interval of accuracy that a person skilled in the art will understand to still ensure the technical effect of the feature in question. The term typically indicates a deviation from the indicated numerical value of ±20%, preferably ±15%, more preferably ±10%, and even more preferably ±5%. In particular, these terms indicate the exact value.

As used in this specification and in the appended claims, the used "%" or "wt %" means "% by weight" unless otherwise indicated.

By "soap composition" is understood as a composition comprising a perfuming or fragrance composition and soap active materials. The soap composition may be liquid or dry. Soap compositions are comprised in personal cleansing compositions such as soap bars, shower gels, or shampoos.

A soap composition is comprised in a syndet-based or soap-based article. In particular, such soap composition is comprised in soap-based shower gel or syndet-based shower gel. In particular, the soap composition is comprised in a syndet-based soap bar. In particular, the soap composition is comprised in a soap bar. In a particular embodiment, the soap composition can be a fabric cleansing soap composition, such as a laundry bar, preferably a soap-based or syndet-based laundry bar.

In a particular embodiment, the "soap composition" is not comprised in a liquid laundry detergent or a fabric softener or a solid laundry detergent in a powder form.

In a particular embodiment, the soap composition or the soap article is in a form of a bar.

In a particular embodiment, the "soap composition" is comprised in a solid cleansing product, more particularly in a solid cleansing comprising a salt of a weak acid.

By "soap active material" is understood as a material comprising a detergent or a surfactant and/or a salt of a weak acid. Typically, a soap active material may be a salt of a weak acid, which may be formed from a fatty acid and strong base like sodium hydroxide. The term surfactant and detergent can be used interchangeably. The detergent may be a synthetic detergent.

The soap active material may be comprised in the soap composition in an amount of 5 to 95 wt %, preferably 10 to 90 wt %, more preferably 10 to 88 wt % of the soap composition. The soap active material may preferably be comprised in the soap composition in an amount of at least 20 wt %, preferably 25 wt %, more preferably 30 wt % or more preferably at least 35 wt % of the soap composition.

A fatty acid may be defined to be a $C_6$ to $C_{25}$ fatty acid, preferably $C_6$ to $C_{24}$, more preferably $C_8$ to $C_{24}$ fatty acid and still more preferably $C_8$ to $C_{22}$ fatty acid. A salt of a fatty acid might be sodium, potassium, ammonium salt of fatty acid, preferably a sodium salt of a fatty acid. The fatty acids or the salts thereof may be derived from plant and animal origin. In an embodiment, the soap bar or soap composition of the present invention may comprise one or more fatty acid or salt thereof selected from the group comprising caprylic, capric, lauric, myristic, palmitic, stearic, oleic, linoleic, alpha linoleic, hydroxy stearic acid, arachidic acid, behenic acid or a mixture thereof.

In one embodiment, the pH of soap solution may be above 5. The pH of soap solution may be preferably about 5.5. The pH of soap solution may be preferably between about 5 to 11. The pH of soap solution may be preferably between about 5.5 to 9.

In another embodiment, the pH of soap solution may be above 8.0. Preferably, the pH of soap solution may be above 9.0. More preferably, the pH of soap solution may be between 9.0 to 10.5.

The soap active material may contain 3-70 wt %, preferably 4-40 wt %, most preferably 5-20 wt % moisture related to the total of the soap active material.

The soap active materials may be a salt of fatty acid, in particular sodium salt of fatty acid.

The term "Soap-based" means that the sodium salt of fatty acid may be present. In a soap composition, the sodium salt of fatty acid may be present in an amount of 40-92 wt %, or 60-87 wt % or 75-84 wt % of the soap composition.

The term "syndet-based" means that the soap composition or the soap article contains at least one synthetic detergent. The synthetic detergent may be present in an amount of 0.001 to 50 wt %, preferably 5 to 40 wt %, more preferably 10 to 30% of the syndet-based soap composition or syndet-based soap article, such as the syndet based-soap bar, syndet-based laundry bar or syndet-based shower gel.

Syndet-based compositions or articles may comprise one or more synthetic detergent or surfactants. Syndet-based compositions or articles may comprise anionic synthetic surfactants. Syndet-based compositions or articles may comprise non-ionic or amphoteric synthetic surfactants. Syndet-based compositions or articles may comprise fatty acids salts with anionic synthetic detergents. The anionic synthetic detergent may be one or more of the group comprising sulfonates, sulfates, isethionates, sarcosinates, phosphates and phosphonates. Syndet-based compositions or articles may comprise one or more synthetic detergent of the group selected from alkyl oligoglycosides alkenyl oligoglycosides. Amino acid based surfactants, Ethoxylated amines, Ethers, Fatty Acid Esters, Amide, Alkanolamides or a combination thereof. Syndet-based compositions or articles may preferably comprise one or more synthetic detergent of the group selected from Linear alkyl benzene sulfonates (LABS), Sodium lauryl ether sulfate (SLES), Sodium dodecyl sulfate (SDS), Alpha-olefin sulfonates, Cocamide MEA, Cocamide DEA, Fatty alcohol ethoxylates, ethoxylated sorbitan esters, α-sulfomethyl esters and alkyl polyglucosides, Ethoxylated amines, Betaines sodium myreth sulfate, sodium cocoyl isethionate (SCI), coco monoglyceride sulfate (CMGS), alkyl glyceryl ether sulfonate (AGES) or combination thereof.

Syndet-based soap compositions or articles may be pure syndet compositions or articles, i.e. compositions or articles, in particular bars, based on synthetic detergents only. The syndet-based soap compositions or articles may not comprise a salt of a fatty acid, in particular a sodium salt of fatty acid. Preferably, the soap and synthetic detergents may also be mixed with soap active material in a soap composition. Such a syndet-based soap composition or article is known as soap-syndet or syndet-based soap composition. The syndet-based soap compositions or articles may comprise a soap active material, such as a salt of a weak acid as defined herein-above and at least one synthetic detergent. The soap active material is in particular a sodium salt of fatty acid.

In a particular embodiment, the soap composition or article comprises a sodium salt of fatty acid in an amount of 40-90 wt % and a synthetic detergent in an amount of 0.0 to 20 wt %, preferably 0.01 to 20 wt % based on the total weight of the soap composition.

In a particular embodiment, the soap composition or article comprises a sodium salt of fatty acid in an amount of 40-90 wt % and a synthetic detergent in an amount of 0.0 to 15 wt %, preferably 0.01 to 15 wt % based on the total weight of the soap composition.

In a particular embodiment, the soap composition or article comprises a sodium salt of fatty acid in an amount of 60-85 wt % and a synthetic detergent in an amount of 0.0 to 15 wt %, preferably 0.01 to 15 wt % based on the total weight of the soap composition.

In a particular embodiment, the soap composition or article comprises a sodium salt of fatty acid in an amount of 40-90 wt %, a synthetic detergent in an amount of 3 to 12 wt %, preferably 5 wt % based on the total weight of the soap composition. In a particular embodiment, the synthetic detergent is a sulfonated or sulfate detergent, more preferably selected from the group comprising synthetic detergent of the group selected from LAS (Linear alkyl benzene sulphonic acid), AOS (alpha olefin sulfonate), ammonium lauryl sulfate, sodium laureth sulfate, sodium lauryl sarcosinate, sodium myreth sulfate, sodium cocoyl isethionate (SCI), coco monoglyceride sulfate (CMGS), alkyl glyceryl ether sulfonate (AGES), betaine or any combination thereof.

In a particular embodiment, the soap composition or article comprises a sodium salt of fatty acid in an amount of 40-90 wt % and a synthetic detergent in an amount of 0.0 to 20 wt %, preferably 0.01 to 20 wt %, more preferably of 0.01 to 15 wt %, based on the total weight of the soap composition, wherein the soap article is preferably a soap bar.

In a particular embodiment, the soap composition or article is syndet based, more preferably a laundry bar.

The laundry bar composition or article may be a pure syndet bar. A pure syndet bar may comprise 5-30 wt %, 10-25% more preferably 15 to 22 wt % of one or more synthetic detergents based on the total weight of the laundry bar. In a particular embodiment, 30 to 75 wt % based on the total weight of the laundry bar may be a filler, structuring agent, builders and/or an insoluble material.

In a particular embodiment, the soap composition or article is syndet based, preferably a soap bar for personal care. The soap bar comprises a sodium salt of fatty acid in an amount of 40 to 60 wt % and a synthetic detergent in an amount of 0.1 to 30 wt % based on the total weight of the soap composition. The composition may comprise betaine, Sodium cocoyl Isethionate (SCI) as a synthetic surfactant.

The soap active material may be comprised in soap noodles. Soap noodles may comprise fatty acids derived either from vegetable oil or animal fats. Soap noodles may be produced from the saponification of neutral fats and oil, neutralization of fatty acid and saponification of methyl esters. Soap noodles may be used as the main ingredient in the production of soap bars and may be therefore used as soap base. This soap base may have a typical smell, which differs from nature of raw material used for manufacturing soap noodle. Common tallow soap base gives synthetic, waxy, creamy, fatty, and animalic note, whereas palm fatty acid-based soap base generates earthy, plastic, burnt and metallic note. This soap base note may aggravate on keeping the soap composition during storage, thereby reducing the fragrance impact. In particular, some bases develop rancid note in addition to normal base smell. Fragrance ingredients of a soap base have the additional problem of covering base odour in addition impart fragrance experience.

The term “fragrance composition” as used herein refers to a composition comprising at least one profragrance compound. The fragrance composition may optionally comprise ingredients selected from the group comprising a fragrance compound, which can be used interchangeably with perfuming compound, a fragrance ingredient, which can be used interchangeably with perfuming ingredient. Such ingredients are well known by the skilled person in the art.

A fragrance composition is in the form of one single ingredient or in the form of a composition of perfuming ingredients. The term “perfuming ingredient” or “fragrance ingredient” may include the “fragrance compound” or “perfuming compound” which is used for the primary purpose of conferring or modulating an odour. Therefore, the term “perfuming compound”, which is interchangeably with the term “fragrance compound”, is to be understood as an active ingredient in perfuming preparations or compositions in order to impart a hedonic effect. In other words, a compound to be considered as being a perfuming ingredient must be recognized by a skilled person in the art of perfumery as being able to impart or modify in a positive or pleasant way the odor of a composition, and not just as having an odor.

For the purpose of the present disclosure, a fragrance composition may also include combination of perfuming ingredients with further perfuming ingredients, which together improve, enhance or modify the delivery of the perfuming compounds such as perfume precursors, emulsions or dispersions, as well as combinations which impart an additional benefit beyond that of modifying or imparting an odour, such as long-lasting, blooming, malodour counteraction, antimicrobial effect, microbial stability, insect control. The nature and type of the perfuming ingredients do not warrant a more detailed description here, which in any case would not be exhaustive. The skilled person is able to select them on the basis of his general knowledge and according to intended use or application and the desired organoleptic effect. In general terms, these perfuming ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming ingredients can be of natural or synthetic origin.

In particular, one may cite perfuming ingredients which are commonly used in perfume formulations, such as:

Aldehydic ingredients: decanal, dodecanal, 2-methyl-undecanal, 10-undecenal, octanal, nonanal and/or nonenal;

Aromatic-herbal ingredients: eucalyptus oil, camphor, eucalyptol, 5-methyltricyclo[6.2.1.0~2,7~]undecan-4-one, 1-methoxy-3-hexanethiol, 2-ethyl-4,4-dimethyl-1,3-oxathiane, 2,2,7/8,9/10-Tetramethylspiro[5.5]undec-8-en-1-one, menthol and/or alpha-pinene;

Balsamic ingredients: coumarin, ethylvanillin and/or vanillin;

Citrus ingredients: dihydromyrcenol, citral, orange oil, linalyl acetate, citronellyl nitrile, orange terpenes, limonene, 1-p-menthen-8-yl acetate and/or 1,4(8)-p-menthadiene;

Floral ingredients: methyl dihydrojasmonate, linalool, citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4(2H)-pyranol, beta ionone, methyl 2-(methylamino) benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2E)-1-(2,6,6-trimethyl-2-cyclohexen-1-yl)-2-buten-1-one, (2E)-1-[2,6,6-trimethyl-3-cyclohexen-1-yl]-2-buten-1-one, (2E)-1-(2,6,6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyl acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyl acetate, 4-(1,1-dimethylethyl)-1-cyclohexyl acetate, verdyl isobutyrate and/or mixture of methylionones isomers;

Fruity ingredients: gamma-undecalactone, 2,2,5-trimethyl-5-pentylcyclopentanone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3,3-dimethylcyclohexyl]ethyl[3-ethyl-2-oxiranyl]acetate and/or diethyl 1,4-cyclohexane dicarboxylate;

Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5,5-dimethyl-1-cyclohexen-1-yl)-4-penten-1-one;

Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{1S)-1-[(1R)-3,3-dimethylcyclohexyl] ethoxy}-2-oxoethyl propionate 3-methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, oxacyclohexadecan-2-one and/or S,1'R)-[1-(3',3'-dimethyl-1'-cyclohexyl)ethoxycarbonyl]methylyl propanoate;

Woody ingredients: 1-[(1RS,6SR)-2,2,6-trimethylcyclohexyl]-3-hexanol, 3,3-dimethyl-5-[(1R)-2,2,3-trimethyl-3-cyclopenten-1-yl]-4-penten-2-ol, 3,4'-dimethylspiro[oxirane-2,9'-tricyclo[6.2.1.$0^{2,7}$]undec[4]ene, (1-ethoxyethoxy)cyclododecane, 2,2,9,11-tetramethylspiro[5.5]undec-8-en-1-yl acetate, 1-(octahydro-2,3,8,8-tetramethyl-2-naphtalenyl)-1-ethanone, patchouli oil, terpenes fractions of patchouli oil, Clearwood®, (1'R,E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2,3,8,8-tetramethyl-1,2,3,4,6,7,8,8a-octahydronaphthalen-2-Aethan-1-one and/or isobornyl acetate;

Other ingredients (e.g. amber, powdery spicy or watery): dodecahydro-3a,6,6,9a-tetramethyl-naphtho[2,1-b] furan and any of its stereoisomers, heliotropin, anisic aldehyde, eugenol, cinnamic aldehyde, clove oil, 3-(1,3-benzodioxol-5-yl)-2-methylpropanal, 7-methyl-2H-1,5-benzodioxepin-3(4H)-one, 2,5,5-trimethyl-1,2,3,4,4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

The fragrance composition may not be limited to the above mentioned perfuming co-ingredients, and many other of these perfuming ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery.

According to the invention, the fragrance composition can comprise in addition to at least one profragrance compound and further fragrance compounds and ingredients, at least one solvent to dissolve said ingredients, which is of current use in the perfumery industry. In an embodiment, the solvent is preferably selected from the group consisting of Dipropylene Glycol (4-oxa-2,6-heptanediol, 2-methyl-3-oxa-1,5-hexanediol, 2,4-dimethyl-3-oxa-1,5-pentanediol), Isopar M (hydrocarbons C13-C14), Isopar L (hydrocarbons C11-C13), Isopropyl Myristate (isopropyl tetradecanoate) Ethyl Citrate (triethyl 2-hydroxy-1,2,3-propanetricarboxylate), Triacetine (1,2,3-propanetriyl triacetate), benzyl benzoate, 1,3-propanediol, vegetable oils such as almond oil, argan oil, cotton oil, corn oil, olive oil, sunflower oil, castor oil and mixtures thereof. In a further embodiment, fragrance composition comprises at least one solvent in an amount of up to 50 wt %, preferably up to 30 wt % of the total fragrance composition.

In still another embodiment, the fragrance composition may be a free oil and/or in an encapsulated oil form. The fragrance composition may be optionally partly or totally encapsulated in a microcapsule or core-shell microcapsule, which refers to a delivery system comprising an oil-based core of a hydrophobic active ingredient encapsulated by a polymeric shell. The fragrance composition may further be optionally partly or totally entrapped within a matrix formed by the carrier material. The carrier material comprises a monomeric, oligomeric or polymeric carrier material, or mixtures of two or more of these. An oligomeric carrier may be a carbohydrate, the oligomeric carrier may be sucrose, lactose, raffinose, maltose, trehalose, fructo-oligosaccharides. Examples of a monomeric carrier materials are glucose, fructose, mannose, galactose, arabinose, fucose, sorbitol, mannitol, for example. Polymeric carriers have more than 10 monomeric units that are linked by covalent bonds. In a preferred embodiment, the carrier may be a polymeric carrier material. Non-limiting examples of polymeric carrier material includes polyvinyl acetates, polyvinyl alcohol, dextrines, maltodextrines, glucose syrups, natural or modified starch, polysaccharides, carbohydrates, chitosan, gum Arabic, polyethylene glycol, polyvinyl pyrrolidone, polyvinyl alcohol, acrylamides, acrylates, polyacrylic acid. The encapsulation of fragrances or perfumes into carrier materials may provide protection against aging, enhance impact during use and sustained-release from substrates.

The term “profragrance compound” as used herein refers to a structure, which links a fragrance compound via a covalent bond to a suitable substrate to form a non-volatile fragrance conjugate. This conjugate provides a release of a fragrance compound, in particular an olfactive fragrance compound, upon trigger with an external stimulus. Profragrance compounds may be based on the Michael-type 1,4-addition of amines, alcohols, carboxylic acids and thiols reacting with the double bond of α,β-unsaturated ketones of a fragrance compound. An external trigger might be the contact with moisture and/or exposure to light and/or increased temperature and/or oxidative environment. Therefore, such profragrances provide a certain control of the kinetics of fragrance release to induce sensory effects through sequential release. In particular, oxygen is used as external stimulus for the release of the fragrance compound. The oxygen might be atmospheric oxygen.

The term “non-volatile fragrance conjugate” means that the “profragrance compound” is a fragrance conjugate, which is less volatile as the fragrance compound.

In a particular embodiment, the profragrance compound of the present invention is selected from the group consisting of a compound (I)

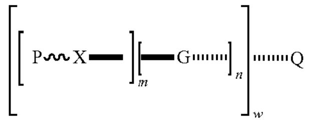

wherein:

a) w represents an integer from 1 to 10000;
b) n represents 1 or 0;
c) m represents an integer from 1 to 6;
d) P represents a hydrogen atom or a radical susceptible of generating an odoriferous α,β-unsaturated ketone, aldehyde or carboxylic ester and is represented by the formula (II)

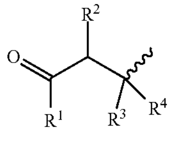

in which the wavy line indicates the location of the bond between said P and X;

$R^1$ represents a hydrogen atom, a $C_1$ to $C_6$ alkoxyl radical or a $C_1$ to $C_{15}$ linear, cyclic or branched alkyl, alkenyl or alkadienyl radical, possibly substituted by $C_1$ to $C_4$ alkyl groups; and $R^2$, $R^3$ and $R^4$ represent a hydrogen atom, an aromatic ring or a $C_1$ to $C_{15}$ linear, cyclic or branched alkyl, alkenyl or alkadienyl radical, possibly substituted by $C_1$ to $C_4$ alkyl groups; or two, or three, of the groups $R^1$ to $R^4$ are bonded together to form a saturated or unsaturated ring having 6 to 20 carbon atoms and including the carbon atom to which said $R^1$, $R^2$, $R^3$ or $R^4$ groups are bonded, this ring being possibly substituted by $C_1$ to $C_8$ linear, branched or cyclic alkyl or alkenyl groups; and with the proviso that at least one of the P groups is of the formula (II) as defined hereinabove;

e) X represents, independently form each other, a functional group selected from the group consisting of the formulae) to xiv):

i)

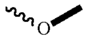

ii)

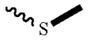

iii)

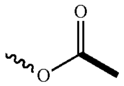

iv)

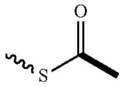

v)

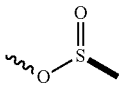

vi)

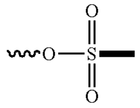

vii)

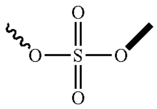

viii)

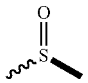

ix)

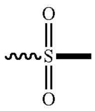

x)

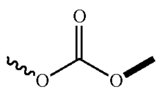

xi)

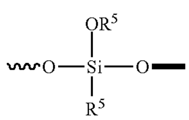

-continued xii)

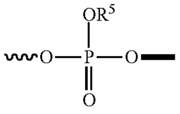

xiii)

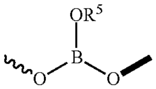

xiv)

in which formulae the wavy lines are as defined previously and the bold lines indicate the location of the bond between said X and G, and $R^5$ represents a hydrogen atom, a $C_1$ to $C_{22}$, saturated or unsaturated, alkyl group or an aryl group, possibly substituted by $C_1$ to $C_6$ alkyl or alkoxyl groups or halogen atoms; and with the proviso that X may not exist when P represents a hydrogen atom;

f) G represents a multivalent radical (with a m+1 valence) derived from cyclic, linear or branched alkyl, cyclic, linear or branched alkenyl, phenyl, alkylphenyl or alkenylphenyl hydrocarbon radical having from 1 to 22 carbon atoms, said hydrocarbon radical being possibly substituted and containing from 1 to 10 functional groups selected from the group consisting of halogens, alcohols, ethers, esters, ketones, aldehydes, carboxylic acids, thiols, thioethers, amines, quaternary amines and amides; and g) Q represents a hydrogen atom (in which case w=1 and n=1), or represents polymer or co-polymer selected from the group consisting of poly(alkylimine)s, polypeptides (e.g. polylysine) or polysaccharides selected from the group consisting of cellulose, cyclodextrins and starches, or cationic quaternised silicon polymers, such as the Abilquat® (origin: Goldsmith, USA), or a polymer or any co-polymer derived from monomeric units selected from the group consisting of the formulae A) to C):

A-1)

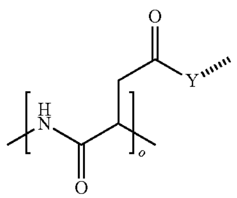

A-2)

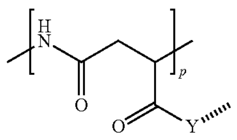

A-3)

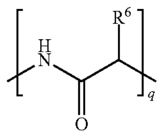

-continued

B-1)

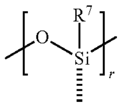

B-2)

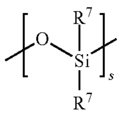

C-1)

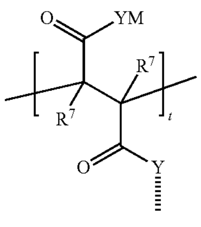

C-2)

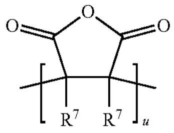

C-3)

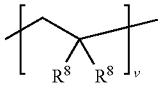

wherein the hatched lines indicate the location of the bond between said monomeric unit and G;

Y represents an oxygen or sulfur atom or a $NR^7$ group;

o, p, q, r, s, t, u and v all represent independent of each other fractions between 0 and 1, with o+p+q=1, r+s=1 and t+u+v=1 and with the proviso that either o or p, as well as r and t are not equal to 0;

$R^6$ represents a hydrogen atom or a side chain from a natural or unnatural amino acid, such as glycine, alanine, phenylalanine, arginine, histidine, lysine, aspartic acid, glutamic acid, cysteine, methionine, glutamine, asparagine, threonine, serine, leucine, isoleucine, valine, tyrosine or tryptophan;

$R^7$ represents, simultaneously or independently, a hydrogen atom or a $C_1$-$C_{16}$ hydrocarbon group;

$R^8$ represents, simultaneously or independently of each other a hydrogen or halide atom;

a $C_1$-$C_6$ hydrocarbon group optionally comprising from 1 to 4 heteroatoms selected from the group consisting of oxygen and sulfur atoms;

a COOR* wherein R* represents a hydrogen atom, a $C_1$ $C_{60}$ alkyl or alkenyl group optionally comprising from 1 to 30 oxygen atoms;

a $OR^7$ group or a $COR^7$ group; or a pyrrolidone unit, connected by the nitrogen atom; and M represents a hydrogen atom, an alkali or earth alkali metal ion.

In another embodiment, X represents a functional group selected from the group consisting of the formulae ii) to iv). In a particular embodiment, X represents the functional group of formula ii).

As "odoriferous α,β-unsaturated ketone, aldehyde or carboxylic ester", the expression used in the definition of P, it is understood an α,β-unsaturated ketone, aldehyde or carboxylic ester, which is recognized by a skilled person as being used in perfumery as perfuming ingredient. In general, said odoriferous α,β-unsaturated ketone, aldehyde or carboxylic ester is a compound having from 8 to 20 carbon atoms, or even more preferably between 10 and 15 carbon atoms.

Similarly, it is not possible to provide an exhaustive list of the currently known odoriferous compounds, which can be used in the synthesis of the invention compounds defined hereinabove and subsequently be released. However, the following can be named as preferred examples: alpha-damascone, beta-damascone, gamma-damascone, delta-damascone, 1-[6-ethyl-2,6-dimethyl-3-cyclohexen-1-yl]-2-buten-1-one, alpha-ionone, beta-ionone, gamma-ionone, delta-ionone, beta-damascenone, 3-methyl-5-propyl-2-cyclohexen-1-one, 2-methyl-5-(1-propen-2-yl)-2-cyclohexen-1-one, 2,5-dimethyl-5-phenyl-1-hexen-3-one, 1-(5,5-dimethyl-1-cyclohexen-1-yl)-4-penten-1-one, 8-methyl-alpha-ionone or 10-methyl-alpha-ionone, 2-octenal, 1-(2,2,3,6-tetramethyl-1-cyclohexyl)-2-buten-1-one, 4-(2,2,3,6-tetramethyl-1-cyclohexyl)-3-buten-2-one, 2-cyclopentadecen-1-one, nootkatone, cinnamic aldehyde, 2,6,6-trimethyl-bicyclo[3.1.1]heptane-3-spiro-2'-cyclohexen-4'-one, ethyl 2,4-deca-dienoate, ethyl 2-octenoate, methyl 2-nonenoate, ethyl 2,4-undecadienoate, and methyl 5,9-dimethyl-2,4,8-decatrienoate.

According to any embodiment of the invention, P may represent a group of the formulae (P-1) to (P-14), in the form of any one of its isomers:

(P-1)

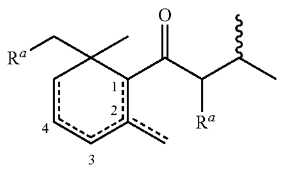

(P-2)

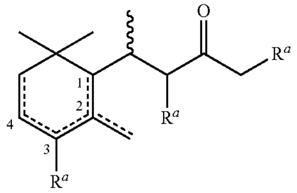

(P-3)

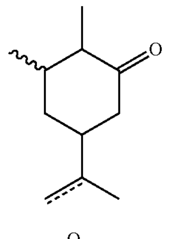

(P-4)

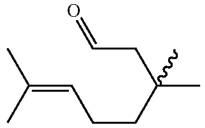

(P-5)

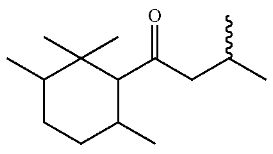

-continued (P-6)

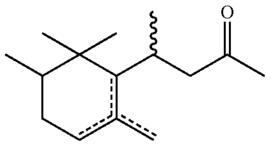

(P-7)

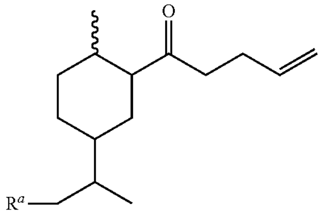

(P-8)

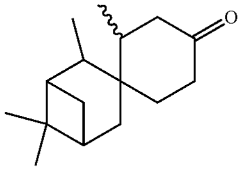

(P-9)

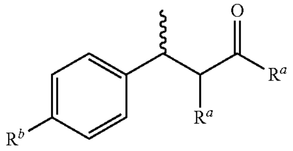

(P-10)

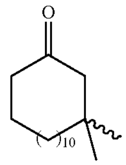

(P-11)

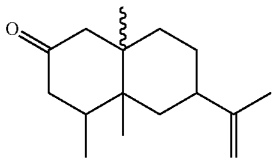

(P-12)

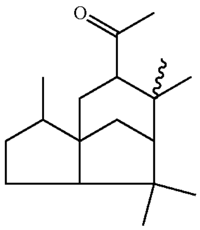

(P-13)

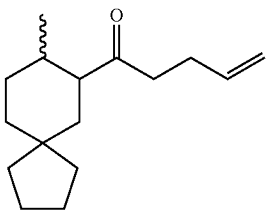

-continued (P-14)

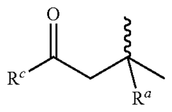

in which formulae the wavy lines have the meaning indicated above and the dotted lines represent a single or double bond, $R^a$ being a hydrogen atom or a methyl group and $R^b$ representing a hydrogen atom, a hydroxyl or methoxy group or a $C_1$-$C_4$ linear or branched alkyl group and $R^c$ representing a hydrogen atom or a $C_1$-$C_4$ linear or branched alkyl group.

According to any embodiment of the invention, P may represent a radical of the formula (P-1)'

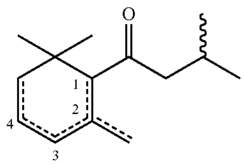

(P-2)'

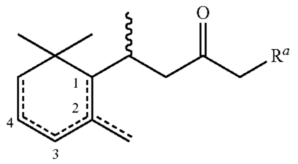

(P-3)

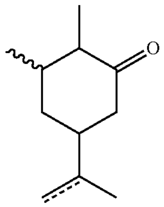

(P-5)

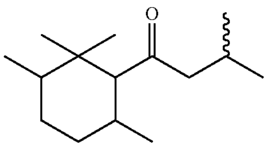

(P-6)

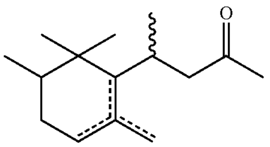

(P-7)

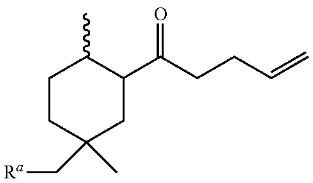

-continued (P-13)

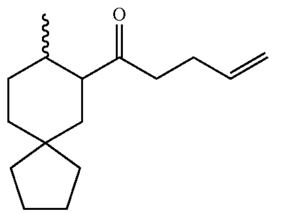

(P-14)'

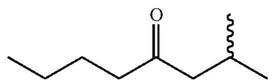

wherein the wavy lines have the meaning indicated above and the dotted lines represent a single or double bond, and $R^a$ being a hydrogen atom or a methyl group.

According to any embodiment of the invention, P may represent a radical of the formula (P-1), (P-2), (P-1)', (P-2)', (P-3), (P-7) or (P-13), (P-14) or (P-14)' as defined above. Even more particularly P may represent a compound of formula (P-1), (P-2) (P-1)', (P-2)', or (P-3) or (P-14).

According to any embodiment of the invention, G may represent a divalent cyclic, linear or branched alkyl, alkenyl, alkandienyl or alkylbenzene hydrocarbon radical having from 1 to 22 carbon atoms, said hydrocarbon radical being possibly substituted and containing from 1 to 10 functional groups selected from the group consisting of ethers, esters, ketones, aldehydes, carboxylic acids, thiols, thioethers, amines, quaternary amines and amides. Particularly, G may represents a divalent linear or branched alkyl hydrocarbon radical having from 1 to 22 carbon atoms, said hydrocarbon radical being possibly substituted and containing from 1 to 5 functional groups selected from the group consisting of ethers, esters, ketones, aldehydes, carboxylic acids, thiols, thioethers, amines, quaternary amines and amides. Particularly, G may represents a divalent linear or branched alkyl hydrocarbon radical having from 2 to 15 carbon atoms, said hydrocarbon radical being possibly substituted and containing from 1 to 2 functional groups selected from the group consisting of ethers, esters. Particularly, G may represents a divalent linear alkyl hydrocarbon radical having from 3 to 15 carbon atoms, said hydrocarbon radical being possibly substituted and containing from 1 ester functional group. Particularly, G may represents a divalent linear alkyl hydrocarbon radical having from 3 to 14 carbon atoms.

According to any embodiment of the invention, Q may represent a hydrogen atom or a co-polymer comprising at least one repeating unit of formula B-1. In particular, Q may represent a hydrogen atom or a co-polymer comprising at least one repeating unit of formula B-1 and at least one repeating unit of formula B-2. According to any embodiment of the invention, $R^7$ may represent, simultaneously or independently, a hydrogen atom or a 01-3 alkyl group. Particularly, $R^7$ may represent, simultaneously or independently, a hydrogen atom or a methyl or an ethyl group. Particularly, $R^7$ may represent, simultaneously or independently, a hydrogen atom or a methyl group.

According to a particular embodiment, the soap composition comprises a profragrance compound, wherein the profragrance compound is selected from the group consisting of formulae a) to d)

a)

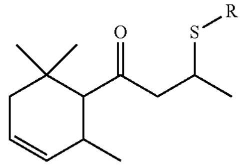

b)

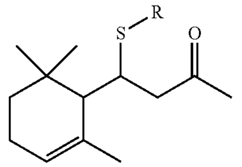

c)

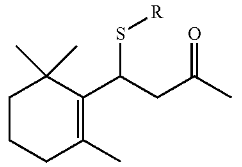

d)

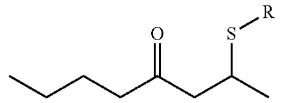

wherein R represents a $C_1$-$C_{20}$ alkyl or alkenyl group, preferably a $C_6$-$C_{16}$ alkyl or alkenyl group, more preferably a $C_{12}$ alkyl group.

According to another particular embodiment, the soap composition comprises a profragrance compound, wherein the profragrance compound is a linear polysiloxane copolymer comprising at least one repeating unit of formula (III)

(III)

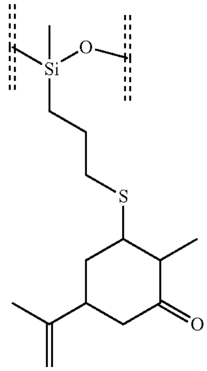

wherein the double hatched lines indicate the bonding to another repeating unit.

By "release of a fragrance compound", it is meant that the profragrance compound releases a fragrance compound, which has an olfactive effect. In particular, such a release of a fragrance compound may be triggered by an external stimulus. This external stimulus might be oxygen. The oxygen might be atmospheric oxygen.

The profragrance of formula III) releases carvone as fragrance compound. Carvone is also known as 2-methyl-5-(prop-1-en-2-yl)cyclohex-2-en-1-one.

The profragrance of formula a) releases delta-damascone as fragrance compound. Said profragrance may preferably be (+−)-trans-3-(dodecylthio)-1-(2,6,6-trimethyl-3-cyclohexen-1-yl)-1-butanone. Delta-damascone is also known as (2Z)-1-[(1RS,2SR)-2,6,6-trimethyl-3-cyclohexen-1-yl]-2-buten-1-one.

The profragrance of formula b) or c) releases ionone as fragrance compound. Said profragrance may be present as an isomeric mixture of formula b) and formula c). The isomeric mixture may have a weight ratio of formula b) and formula c) from 40:60 to 60:40. In particular, the isomeric mixture may have a weight ratio of formula b) and formula c) of about 55:45. In particular, said profragrance releases two isomers of ionone as fragrance compound.

In particular, the profragrance of formula b) releases alpha-ionone as fragrance compound. Said profragrance of formula b) may preferably be (++4-(dodecylthio)-4-(2,6,6-trimethyl-2-cyclohexen-1-yl)-2-butanone. Alpha-ionone is also known as (+−)-(3E)-4-(2,6,6-trimethyl-2-cyclohexen-1-yl)-3-buten-2-one.

In particular, the profragrance of formula c) releases beta-ionone as fragrance compound. Said profragrance of formula c) may preferably be (+−)-4-(dodecylthio)-4-(2,6,6-trimethyl-1-cyclohexen-1-yl)-2-butanone. Beta-ionone is also known as (3E)-4-(2,6,6-trimethyl-1-cyclohexen-1-yl)-3-buten-2-one.

The profragrance of formula d) releases oct-2-en-4-one as fragrance compound. Said pro-perfume may preferably be (±)-2-(dodecylthio)octan-4-one. Oct-2-en-4-one may be released as its (E)- or (Z)-isomers, or as mixtures thereof, with the (E)-isomer being preferred.

According to any embodiment of the invention, and as non-limiting examples of such β-thio carbonyl profragrance derivative of formula (I) one may cites the following: 3-(dodecylthio)-1-(2,6,6-trimethylcyclohex-3-en-1-yl)butan-1-one (derived from δdamascone, also known and referred as Haloscent® D), 3-(dodecylthio)-1-(2,6,6-trimethylcyclohex-2-en-1-yl)butan-1-one (derived from α-damascone) or 4-(dodecylthio)-4-(2,6,6-trimethylcyclohex-2-en-1-yl)butan-2-one (derived from ionone, also known and referred as Haloscent® I), 4-(dodecylthio)-4-(2,6,6-trimethylcyclohex-1-en-1-yl)butan-2-one (derived from ionone, also known and referred as Haloscent® I) or a mixture thereof.

In another embodiment, the soap composition comprises 1 to 8 structurally different profragrances. In a further embodiment, the soap composition may comprise 1 to 3 structurally different profragrances. In a particular embodiment, the soap composition comprises 1 or 2 profragrance (s). The term "structurally different profragrances" as used herein includes constitution isomers. In contrast, profragrances, which are not structurally different also comprise configuration isomers and conformation isomers. Therefore, the alpha and beta isomer of profragrances of formula b) and c) may not be understand as "structurally different profragrances".

In a further embodiment, the soap composition comprises two different profragrance compounds in certain weight ratios. The two different profragrance may comprise compounds, which may be selected from the group consisting of formula a), b), c), and III). In particular the two different profragrance compounds may comprise formula a), and b), and/or c). The profragrances of formula a) and profragrance of formula b) and c) might be used in a weight ratio from about 10:1 to 1:10, preferably from about 5:1 to 1:5, more preferably from about 2:1 to 1:2. In a particular embodiment, the weight ratio of the profragrance of formula a) and the profragrance of formula b) and c) is 1:1.

According to a particular embodiment, the soap composition comprises a fragrance composition, wherein the fragrance composition may be present in the amount of from 0.01 to 10 wt %, preferably from 0.1 to 3 wt %, preferably from 0.3 to 1.8 wt. %, more preferably 0.5 to 1.2 wt %, based on the total weight of the soap composition. The fragrance composition comprises at least one profragrance, wherein the at least one profragrance may be present in an amount from 0.01 to 10 wt %, preferably from 0.02 to 7 wt %, preferably from 0.5 to 8 wt % of the fragrance composition. In a particular embodiment the at least one profragrance may be present in an amount from 0.1 to 5 wt % of the fragrance composition. In a further embodiment, the at least one profragrance reacts with oxygen, wherein the at least one profragrance releases at least one fragrance in an amount from 0.01 to 10 wt %, preferably from 0.05 to 8 wt % of the fragrance composition.

In an embodiment, the soap composition or the soap article confers, improves, enhances or modifies the fragrance intensity of the fragrance composition on a skin, surface or in the air surrounding of the skin, the surface or the soap article over a prolonged period of time, preferably over a period of time of 48 hours, preferably 24 hours, more preferably 18 hours, even more preferably 12 hours, most preferably 10 or 8 hours under ambient conditions. Such a prolonged period of time, in which the fragrance intensity is improved on a surface or in the air surrounding of the surface may be up to 48 hours after use of the soap composition under ambient conditions. Such a prolonged period of time, in which the fragrance intensity is improved on a surface or in the air surrounding of the surface may be at least 12 hours after use of the soap composition under ambient conditions. Such a prolonged period of time, in which the fragrance intensity is improved on the skin or in the air surrounding of the skin may be at least 4 hours, preferably 8 hours after use of the soap composition under ambient conditions. Such a prolonged period of time, in which the fragrance intensity is improved on the skin or in the air surrounding of the skin may be up to 12 hours after use of the soap composition under ambient conditions. The soap composition or the soap article of the present invention is therefore applied to a skin, surface or air by lathering and or washing a surface or skin. The soap composition or the soap article of the present invention is applied under ambient temperature during exposure to oxygen.

The term "surface" as used herein refers to any surface on which soap can be applied on. A surface may be a textile or a hard surface. A hard surface may be any of, but is not limited to, wood, ceramics, metal, glass, stone, plastic, or leather. A textile may be any of, but is not limited to, woven fabric or a non-woven fabric.

In one embodiment, the soap composition or the soap article confers, improves, enhances or modifies fragrance retention of the fragrance composition over a prolonged period of time, preferably over a period of time of 24 month, 18 months, preferably 12 months, more preferably 3 months, in a soap composition or soap article during storage. The storage of the soap composition or soap article occurs under ambient temperature during exposure to oxygen.

According to another particular embodiment, the soap composition comprises a profragrance compound, wherein the profragrance compound may be present in an amount of from 0.000001 to 1 wt %, preferably 0.00001 to 0.1 wt %, more preferably 0.00005 to 0.09 wt %, even more preferably 0.00025 to 0.036 wt %, most preferably 0.005 to 0.03 wt % based on the total weight of the soap composition.

According to further particular embodiment, the soap composition comprises the profragrance, wherein the profragrance releases a fragrance compound upon reacting with oxygen in an amount of from 0.01 to 10 wt %, preferably from 0.05 to 8 wt %, based on the total weight of the fragrance composition over a prolonged period of time, preferably over a period of time of 18 months, preferably 12 months, more preferably 3 months, after exposure to oxygen at ambient temperature. Such a prolonged period of time, in which the profragrance releases a fragrance compound may be up to 24 months after exposure to oxygen at ambient temperature. Such a prolonged period of time, in which the profragrance releases a fragrance compound may be at least 12 months after exposure to oxygen at ambient temperature. Such a prolonged period of time, in which the profragrance releases a fragrance compound may be at least 3 months after exposure to oxygen at ambient temperature.

According to another particular embodiment, the soap composition further comprises a filler, wherein the filler is present in an amount of from 0.002 to 35 wt %, preferably 0.2 to 5.0 wt %, and is optionally one or more compound selected from the group comprising $TiO_2$, talc and sugar. The sugar used as filler may be any sugar, in particular sorbitol, or any sugar in combination with sorbitol. A soap article may comprise a filler.

In a second aspect, the present invention relates to soap article comprising a soap composition as defined above.

According to another particular embodiment, the soap article may be in the form of a liquid cleanser, toilet bar, laundry bar, preferably a soap-based or syndet-based laundry bar, shaving composition, personal cleansing composition, body care product, perfume, shampoo, preferably a shower gel, preferably a soap-based shower gel or syndet-based shower gel, more preferably a syndet-based soap bar, or most preferably a soap bar. In an embodiment, the soap article may be in the form of a laundry bar. In a further embodiment, the soap article may be in the form of a syndet-based soap bar, a soap bar or a soap-based shower gel or syndet-based shower gel. In a particular embodiment, the soap article may be in the form of a soap bar. In a particular embodiment, the "soap article" does not comprise a liquid laundry detergent or a fabric softener. In a further particular embodiment, the "soap article" does not comprise a solid laundry detergent in a powder form. In a particular embodiment, "soap article" is a laundry bar.

In an embodiment, the soap bar or soap composition of the present invention may comprise one or more surfactants. The surfactant is one or more compound selected from the group consisting of sodium salt of fatty acid, such as sodium salt of palm oil fatty acid, sodium salt of palm kernel oil fatty acid, linear alkyl benzene sulphonic acid, ammonium lauryl sulfate, ammonium laureth sulfate, sodium lauryl sarcosinate and/or sodium myreth sulfate. A synthetic surfactant may be a synthetic surfactant of the group selected from LAS (Linear alkyl benzene sulphonic acid), AOS (alpha olefin sulfonate), ammonium lauryl sulfate, sodium laureth sulfate, sodium lauryl sarcosinate, sodium myreth sulfate, sodium cocoyl isethionate (SCI), coco monoglyceride sulfate (CMGS), alkyl glyceryl ether sulfonate (AGES) or combination thereof. In one embodiment the soap active material might contain one or more synthetic detergent selected from the group comprising of sulfonates, sulfates, alcohol sulfates, alcohol ethoxylates, ethoxylated alkyl phenols, sulphated fatty alcohol ethoxylate, lignosulfonates, isethionates, sarcosinates, glutamate, organo phosphite, phosphates, phosphones, betaine, sugar esters, ethoxylated amines, ether, fatty acid esters, amide, alkanolamides or a combination thereof. In one embodiment the soap active material might contain one or more synthetic detergent selected from the group comprising linear alkyl benzene sulfonates (LABS), sodium lauryl ether sulfate (SLES), sodium dodecyl sulfate (SDS), alpha-olefin sulfonates, cocamide MEA, cocamide DEA, fatty alcohol ethoxylates, ethoxylated sorbitan esters, $\alpha$-sulfomethyl esters, betaines or a combination thereof.

In a further embodiment the soap bar or soap composition of the present invention may optionally further comprise one or more ingredients selected from a processing aid, humectant, filler, sequestrant, neutralizer, superfattening agent, binder, builder, structuring agent, preservative and dye. In a particular embodiment, the soap composition comprises at least a surfactant, a processing aid, a neutralizer, a humectant and a profragrance. In one embodiment, the processing aid may be sodium chloride, sodium sulphate, sodium carbonate or sodium phosphates or a combination thereof. In a particular embodiment, the processing aid may be sodium chloride. In a particular embodiment, the neutralizer may be sodium hydroxide. In a particular embodiment, the filler may be titanium dioxide, talcum powder, bentonite, china clay, dolomite, calcite, starch, sodium sulphate ($Na_2SO_4$), aluminium Sulphate, sodium carbonate ($Na_2CO_3$), sodium phosphates, soda ash, Sodium silicate, Sodium aluminosilicate, Sodium aluminophosphate and Sodium aluminate or a combination thereof. The term "sodium phosphates" as used herein are sodium phosphates, which may exists in different grades. Moreover, the phosphates may be condensed anions including di-, tri-, tetra-, and polyphosphates. These salts may be in anhydrous water-free and hydrated forms. Sodium phosphate as used herein generally relates to sodium tripolyphosphate ($Na_5P_3O_{10}$). In a particular embodiment, the humectant may be glycerin, sorbitol, a sugar or a combination thereof. In a particular embodiment, a structuring agent may be added to the soap bar or soap composition of the present invention. the structuring agent may be a salt. In a particular embodiment, the sequestrant may be tertrasodium etidronate, tertrasodium ethylenediaminetetraacetic acid (EDTA) or a combination thereof. In a particular embodiment, titanium dioxide is used as whitening agent. In a particular embodiment, the binder may be starch or a polymer. The polymer may be carboxymethyl cellulose. In another embodiment no binder is used in the soap composition. In a particular embodiment, the superfattening agent may be lauric acid. The superfattening agent may be present in an amount of 0.1 to 10 wt %, preferably of 1 to 5 wt % of the soap bar or of the soap composition. In a particular embodiment, the dye may be CI 12490, CI 12740, or CI 12150. The dye may be comprised in an amount of 0.000001 to 0.001 wt %, preferably of 0.00001 to 0.0001 wt % of the soap bar or of the soap composition.

According to another particular embodiment, the soap bar or the soap composition further comprises a filler, wherein the filler is present in an amount of from 0.002 to 35 wt %, preferably 0.2 to 5.0 wt %. The filler is optionally one or more compound selected from the group comprising $TiO_2$, talc, bentonite, china clay, calcium carbonate, sugar, sodium sulphate, aluminium sulphate, sodium carbonate, sodium silicate, bentonite, soda ash, sodium aluminosilicate, sodium aluminophosphate and sodium aluminate or sodium phosphates. The sugar used as filler may be any sugar, in particular sorbitol, or any sugar in combination with sorbitol.

In a further embodiment, the soap bar of the present invention may have an air freshening effect. The soap bar of the invention has a long-lasting air freshening effect, when the soap bar is used normally in room such as a toilet room. A normal use of soap bars might be more than 50 times per day for hand washing. A normal use of soap bars might be up to 50 times per day for hand washing. A normal use of soap bars might be about 20 times per day for hand washing. The air freshening effect of a soap bar might be at least for 12 hours. In particular, the air freshening effect of a soap bar might be at least for 18 hours. The air freshening effect of a soap bar might be up to for 3 months, when the soap bar is used normally. The air freshening effect of a dry soap bar might be at least for 3 months. The soap bar may have an air freshening effect in a wet state as well as in a dry state. A dry soap bar is a soap bar, which does not have contact to water. A dry soap bar might also be a soap bar, which had contact to water more than 2 hours, preferably more than 4 hours, more preferably more than 6 hours ago. The air freshening effect of a dry soap bar of the present invention might be over a prolonged period of time. The air freshening effect of a dry soap bar might be at least for 1 months, when the soap bar lies in the cabin. The air freshening effect of a dry soap bar might be up to 3 months, when the soap bar lies in the cabin. Therefore, even if the soap bar lies in a cabin or a toilet room, the air freshening effect is long-lasting.

The soap bar of the invention may comprise any of the following ingredients either alone or in combination with each other in the respective amounts:

40-90 wt %, or preferably 60-85 wt % of sodium salt of fatty acid, 0.0-5.0 wt %, or preferably 0.0-3.0 wt % of linear alkyl benzene sulphonic acid, optionally 0.0-5.0 wt %, or preferably 0.0-3.0 wt % of alpha olefin sulphonate, optionally 0.0-5.0 wt %, or preferably 0.0-3.0 wt % of ammonium lauryl sulfate, ammonium laureth sulfate, sodium lauryl sarcosinate and/or sodium myreth sulfate, 0.05-1.5 wt %, or preferably 0.4-0.8 wt % of sodium chloride;

0.01-13 wt %, or preferably 0.01-2.0 wt % of sodium hydroxide, 0.1-35 wt %, or preferably 0.3-10 wt % or more preferably 0.2-5 wt % of a filler comprising talcum powder, bentonite, starch, sugar, sodium sulphate, sodium carbonate or sodium phosphate or a combination thereof;

0.1-9 wt %, or preferably 1.0-5.0 wt % of glycerin;

0.0-9.0 wt %, or preferably 0.0-5.0 wt % of sorbitol and/or a sugar;

0.1-0.5 wt %, or preferably 0.1-0.3 wt % of titanium dioxide;

0.001-0.4 wt %, or preferably 0.01-0.2 wt % of tertrasodium etidronate;

0.001-0.4 wt %, or preferably 0.01-0.2 wt % of tertrasodium EDTA;

0.1-3.0 wt %, or preferably 0.5-1.2 wt % of the perfume composition herein defined; and 8.0-18 wt %, or preferably 10-12 wt % of water by weight of the total soap bar.

In a third aspect, the present invention relates to the use of the soap composition or the soap article to confer, improve, enhance or modify the fragrance intensity of the fragrance composition on a skin, surface or in the air surrounding of the skin, the surface or the soap article over a prolonged period of time, preferably over a period of time of 48 hours, preferably 24 hours, more preferably 18 hours, even more preferably 12 hours, most preferably 10 or 8 hours under ambient conditions. Such a prolonged period of time, in which the fragrance intensity is improved may be up to 48 hours after use of the soap composition under ambient conditions. Moreover, such a prolonged period of time, in which the fragrance intensity is improved may be at least 8 hours after use of the soap composition under ambient conditions. Moreover, such a prolonged period of time, in which the fragrance intensity is improved may be 8-10 hours after use of the soap composition under ambient conditions. In a particular embodiment a prolonged period of time, in which the fragrance intensity is improved or modified may be at least 12 hours after use of the soap composition under ambient conditions.

In a further aspect, the present invention relates to a method for conferring, improving, enhancing or modifying fragrance intensity of the fragrance composition on a skin, surface or in the air surrounding or the soap article over a prolonged period of time, preferably over a period of time of 48 hours, preferably 24 hours, more preferably 18 hours, even more preferably 12 hours, most preferably 10 or 8 hours under ambient conditions, wherein the method comprises the step of applying soap composition of the present invention or the soap article of the present invention to a skin, surface or air.

In another aspect, the present invention relates to the use of a profragrance as defined herein above to confer, improve, enhance or modify perfume retention of the fragrance composition in a soap composition or soap article during storage over a prolonged period of time, preferably over a period of time of 18 months, preferably 12 months, more preferably 3 months. Such a prolonged period of time, in which the profragrance releases a fragrance compound may be up to 24 months after exposure to oxygen at ambient temperature. Moreover, such a prolonged period of time, in which the profragrance releases a fragrance compound may be at least 12 months after exposure to oxygen at ambient temperature.

In a further aspect, the present invention relates to a method of conferring, improving, enhancing or modifying perfume retention of the fragrance composition over a prolonged period of time, preferably over a period of time of 18 months, preferably 12 months, more preferably 3 months, in a soap composition or soap article during storage, wherein the method comprises the step of incorporating a profragrance as defined herein above in a soap composition or a soap article.

EXAMPLES

The present invention will be described in further detail by way of the following non-limiting examples.

Example 1: Soap Bar Formulation

A soap bar relates to the following composition in Table 1:

TABLE 1

Exemplary Soap Bar formulation

| Ingredients | Amount (% wt) |
|---|---|
| Sodium salt of Palm oil Fatty acid | 68.6 |
| Sodium salt of Palm Kernel oil Fatty acid | 17.15 |
| Sodium Chloride | 0.5 |
| Glycerine | 0.5 |
| Titanium Dioxide | 0.3 |

TABLE 1-continued

| Exemplary Soap Bar formulation | |
|---|---|
| Ingredients | Amount (% wt) |
| Tetrasodium Etidronate | 0.15 |
| Tetrasodium EDTA (HEDP) | 0.1 |
| Perfume | 1 |
| Water | 11.7 (q.s.) |

Example 2: Preparation of Soap Noodles Comprising a Profragrance

TABLE 2

Exemplary composition of soap noodles
Soap noodle formulation (soap noodle of following composition is purchased from PT. Wilmar Nabati Indonesia under the brand name: WLFARIN SOAP NOODLE)

| Ingredients | Amount (% wt) | INCI Nomenclature | CAS No. |
|---|---|---|---|
| Sodium Salt of Palm Oil Fatty Acid | 68.6 | Sodium Palmate | 61790-79-2 |
| Sodium Salt of palm Kernel fatty Acid | 17.15 | Sodium Palm Kemelate | 61789-89-7 |
| Glycerine | 0.5 | Glycerine | 56-81-5 |
| Water | 13 (q.s.) | Aqua | 7732-18-5 |
| Sodium Chloride | 0.5 | Sodium Chloride | 7647-14-5 |
| Tetrasodium Etidronate | 0.15 | Sodium EDTA | 64-02-8 |
| HEDP | 0.1 | Tetra Sodium Etidronate | 3794-83-0 |

| Ingredients | Amount (% wt) |
|---|---|
| Soap Noodle | 98.3 |
| Titanium Dioxide (TiO2) | 0.2 |
| Perfume | 1.5 |

Soap Noodles were mixed with $TiO_2$ and perfume by passing it several times in soap plodder. The soap noodles were then plodded in final plodder and stamped in the form of tablet in a stamper.

Exemplary Preparation of Soap Noodles

Soap noodles were made from distilled palm and palm kernel fatty acid. The soap noodles had been supplied by PT. Wilmer Nabati Indonesia. The soap noodles were weighed out and added to a typical Z arm soap mixer. The soap noodles utilized in this example had a moisture content of about 12%. The soap materials utilized in the present invention have a moisture content between about 10% and about 15%. Titanium dioxide, fragrance added separately to the Z arm soap mixer. The components were mixed for about 5 to 10 minutes for homogenization and was then transferred from the mixer to a plodder. The plodder was a soap extruder composed of screw made of Aluminum/or stainless steel, a barrel that is jacketed for cooling by means of a water chiller, a hopper to feed the soap coming from Z arm mixer, a gearbox and electrical system to run the machine. The homogenized soap from Z arm mixer were processed through a plodder and stamped into soap bars in a soap bar making system. The soap bars were formed without any double stamping and with clean bar edges. The soap bars were packed in corrugated boxes. When used in a conventional manner, those soap bars were suitable for use on skin.

Perfumery Compositions for Soap Bars—Overview

For perfumery composition, provide simplified formula in table below.

- Fragrance A (Table 3)
  - Fragrance A1 (Table 3+3% profragrance of Formula a))
  - Fragrance A2 (Table 3+3% profragrance of Formula b) and c))
- Fragrance B (Table 5)
  - B1—(Fragrance B+1.25% profragrance of Formula a)+1.25% profragrance of Formula b) and c))
  - B2—(Fragrance B+2.5% profragrance of Formula a))
  - B3—(Fragrance B+2.5% profragrance of Formula b) and c))
- Fragrance C (Table 7)
  - Fragrance C1 (Table 7+1% profragrance of Formula a))
- Fragrance D (Table 9)
  - Fragrance D1 (Table 9+0.05% profragrance of Formula a))

Example 3: Olfactive Evaluation of the Release of a Perfumery Composition A Incorporated into a Soap Bar Olfactive evaluation of the release of a perfume composition incorporated into a dry soap bar (dry soap bar), i.e. the soap bar which is not used with additional water, post wash smell on skin (post wash), the room air filling during lathering stage (cabin bloom immediate), the room air filling after certain hours (cabin bloom 4 hours). All evaluation had been conducted with 3, 4 or 5 panelists.

a) All the soap bar samples were produced and matured for at least 2 days, in particular for 4 days, before evaluation.

b) Soap bar (dry) smell assessment: dry soap bar was assessed from the corrugated box; rating and comments from evaluators were noted.

c) Bar soap (lathering from forearm) smell assessment in evaluation cabin (isolated small cabin with wash basin and air purging facility for cleaning up residual odour, if any): The soap was applied on the clean forearm of one the volunteer. Soap bar (40 g weight) was washed in running tap water for 10 seconds and the wet soap was rubbed back and forth 10 times in one forearm. With little water typical lather was generated on the applied area before evaluation. The process was repeated for the other arm. Soap lathers on volunteers' forearm were evaluated immediately by the panelists.

d) The cabin bloom was assessed from outside through the smelling window immediately after the lathering.

e) The same cabin bloom was evaluated after 4 hours.

Fragrance A

TABLE 3

Table 3 provides a summary of the category of components of the Fragrance A

| Category | Quantity |
|---|---|
| Aldehydic | 75 |
| Animalic | 8.07 |
| Apple | 55 |
| Brown Sugar | 9 |
| Clove | 24.29 |
| Floral | 356.82 |

TABLE 3-continued

| Table 3 provides a summary of the category of components of the Fragrance A | |
|---|---|
| Category | Quantity |
| Freesia | 84 |
| Fruity | 226.4 |
| Green | 3 |
| Lactonic Fruits | 14 |
| Marine | 4 |
| Musky | 35 |
| Orange Flower | 7 |
| Pineapple | 10 |
| Powdery | 4 |
| Raspberry | 6 |
| Rhubarb | 5 |
| Rose | 67.4 |
| Violet | 25 |
| Violet Flowers | 8 |
| Watery | 8 |
| Wintergreen | 0.2 |
| Woody | 80 |
| Ylang | 1.3 |
| Total | 1116.48 |

Olfactive Descriptors of the Fragrance:

Aldehydic, floral, musky, spicy and woody.

TABLE 4

Results of the evaluation with fragrance A at different wash stages

| Options | Dry soap bar | Lathering | Post Wash | Cabin Bloom Immediate | Cabin Bloom after 4 hrs |
|---|---|---|---|---|---|
| After 2 days of making the batch (Evaluation scale 0-5; 0-no fragrance, 5-too strong) | | | | | |
| Fragrance A | 3.5 | 3.5 | 3.5 | 3 | 2 |
| Fragrance A1 | 4 | 4 | 4 | 3.5 | 2.5 |
| Fragrance A2 | 3.8 | 3.7 | 3.7 | 3.2 | 2.5 |
| After 7 days of making the batch-kept at 50° C. (Evaluation scale 0-5; 0-no fragrance, 5-too strong) | | | | | |
| Fragrance A | 3 | 3 | 3 | 2.8 | 1.5 |
| Fragrance A1 | 3.5 | 3.4 | 3.4 | 3.2 | 2 |
| Fragrance A2 | 3.3 | 3.3 | 3.3 | 3 | 2 |

Evaluators provide olfactive rating after smelling each soap in respective evaluation stages. The average of all ratings are tabulated above. Higher rating indicates better olfactive performance.

The soap bars were evaluated 2 days at 25 to 27° C. after producing the sample and the evaluation showed noticeable improvement in fragrance intensity for fragrance A1 and fragrance A2 (with profragrance of Formula a) and profragrance of Formula b) and c), respectively). The effect started even 2 days after making the batch.

Another set of bars was kept at 50° C. for 7 days. This condition was chosen to mimic the market sample after around 2 months. The evaluation showed noticeable improvement in fragrance intensity for fragrance A1 and fragrance A2 with profragrance of Formula a) and profragrance of Formula b) and c), respectively. The effect was also noticeable after 7 days at 50° C. after making the batch.

Example 4: Evaluation of a Soap Bar in Different Stages Olfactive as Well as Analytical Fragrance B

TABLE 5

| Table 5 provides a summary of the category of components of the Fragrance B. | |
|---|---|
| Category | Quantity |
| Aldehydic | 93.98 |
| Apple | 50.00 |
| Banana | 5.00 |
| Bergamot | 30.00 |
| Brown Sugar | 10.00 |
| Cedar Wood | 75.00 |
| Citrus | 15.00 |
| Clove | 25.29 |
| Floral | 349.83 |
| Freesia | 89.00 |
| Fruity | 223.40 |
| Galbanum | 5.00 |
| Geranium | 4.02 |
| Green | 4.00 |
| Hay | 20.27 |
| Lactonic Fruits | 25.00 |
| Lily of the Valley | 1.10 |
| Marine | 5.00 |
| Melon | 6.00 |
| Musky | 5.78 |
| Oak Moss | 1.96 |
| Orange Flower | 9.00 |
| Patchouli | 10.00 |
| Pineapple | 10.00 |
| Powdery | 6.15 |
| Raspberry | 5.00 |
| Rhubarb | 5.00 |
| Rose | 109.40 |
| Sandalwood | 20.13 |
| Violet | 45.00 |
| Watery | 12.00 |
| Woody | 8.83 |
| Total | 1285.14 |

Olfactive Descriptors of the Fragrance:

Musky, floral, aldehydic, ambery, fruity, and woody.

a) Head-Space Solid-Phase Micro-Extraction of Soap Bars Over a Period of Time

Profragrance of Formula a) and profragrance of Formula b) and c) were added in Fragrance B at following dosage level and soaps are prepared with isodoses of fragrance; following 4 options were used for further evaluation.

Fragrance Details:

1. Fragrance B (Control)
2. B1—(Fragrance B+1.25% profragrance of Formula a)+1.25% profragrance of Formula b) and Formula c))
3. B2—(Fragrance B+2.5% profragrance of Formula a))
4. B3—(Fragrance B+2.5% profragrance of Formula b) and Formula c))

The soaps bars (90 g) were prepared and kept at following stability condition for further evaluation: The analytical data of a grated soap bar stored at 45° C. in each time interval of 1 month, 2 months and 3 months in comparison to a control without formula a) or formula b) and c) is shown in FIG. 1. The samples were analyzed for delta-damascone and alpha- and beta-ionone. The increase of areas of delta-damascone, alpha- and beta-ionone are shown in bar chart (FIG. 1). Formula a) produced delta-damascone whereas formula b) and c) produced alpha- and beta-ionone on oxidative reaction with atmospheric oxygen. The method followed for soap bar analysis were as follows:

The surface of the soap bar was grated. 0.5 g was sampled in duplicates, followed by HS-SPME (Head-Space Solid-Phase Micro-Extraction). The machine used for GC-MS: Agilent 6890/5973 with GERSTEL MPS2 & SPME. The results are shown in FIG. 1. FIG. 1 shows the increase in number of ions of Delta-damascone, alpha-ionone, beta-ionone in a Head-Space Solid-Phase Micro-Extraction (HS-SPME) from grated surface of a soap bar, after storage of the soap bar at 45° C. for 1 month, 2 months and 3 months (represented by peak area). Therefore, FIG. 1 shows clearly the release of the compounds delta-damascone, alpha- or beta-ionone at each time point of the analysis.

Gas Chromatography-Mass Spectrometry (GC-MS)

GCMS principle on soap fragrances: GC-MS was used for the detection of volatile chemical compounds using the relative gas chromatographic retention times and elution patterns of components of a fragrance mixture in combination with the mass spectral fragmentation patterns. In the gas chromatography, the components of the sample will partition (i.e. distribute) between the two phases: the stationary phase and the mobile phase. Compounds that have greater affinity for the stationary phase spend more time in the column and thus elute later and have a longer retention time (tR) than samples that have higher affinity for the mobile phase. Detectors used are Flame-ionization detectors (FID) and mass spectrometry detectors (MS). With an FID, a sample is ignited upon exit from the column, and the ions produced in the flame are "counted" by the amount of electric current. A mass spectrometer counts the number of ions produced from all the fragments detected in the instrument. By SPME method; Soap is grated and diluted 10 times before adding in the SPME vial of the GC machine. 1 g of diluted solution is generally used. The soap solution was heated in the machine at 60° C. and the volatile pass through GC machine. Analysis was always carried out in duplicate.

b) Analytical Evaluation of Soap Bars Over a Period of Time

Delta-damascone peak area—AA: Fragrance B1 with 1.25 wt % each of formula a) and formula b) and c) showed an increase in delta-damascone peak starting from first month. Gradual release of delta-damascone could be established. Fragrance B2 with 2.5 wt % formula a), the release of delta-damascone was more. Increased usage of formula a) resulted in an increase release of delta damascene in the analysis (FIG. 1).

Alpha-ionone peak area—BB: Fragrance B1 with 1.25 wt % both profragrance of formula a) and profragrance of formula b) and c) showed increase in alpha-ionone peak starting from first month. Gradual release of alpha-ionone could be established. Fragrance B3 with 2.5 wt % profragrance of formula b) and c), the release of alpha-ionone was more. The increase of usage of formula b) and c) in product resulted in an increase release of alpha-ionone (FIG. 1).

Beta-ionone peak area—CC: Fragrance B1 with 1.25% each of formula a) and formula b) and c) show increase in beta-ionone peak starting from first month. Gradual release of beta-ionone could be established. Fragrance B3 with 2.5 wt % formula b) and c), the release of beta-ionone was more. The increase of usage of profragrance of formula b) and c) in product resulted in an increase release of beta-ionone (FIG. 1).

c) Olfactive Evaluation of Soap Bars in Different Stages

Olfactive evaluation of wash stages of matured soap: The soap bar was evaluated at 1 month, 2 month, and 3 month interval using the protocol of Example 3. Following phases were assessed:

a. Dry bar
b. Lathering
c. Skin long lastingness (post wash, pat dry)
d. Cabin bloom after 4 hours
e. Cabin bloom at 18 hours Significant improvement of the fragrance intensity was observed with all fragrances comprising formula a) and formula b) and c) in comparison to the control as shown below (Table 6). The effect got more pronounced on stability of the fragrance. The stability of the fragrance is given by the loss of fragrance ingredients by degradation and/or evaporation. The profragrances such as the thioethers such formula a) and formula b) and c) are molecules with a high molecular weight. Thus, those profragrances do not evaporate easily. This makes the effect on stability of those molecules even more apparent, as some other ingredients have already evaporated from the surface or have been degraded by the reaction with the soap base. Soap bars were kept at 45° C. for 3 months to mimic shelf life condition in market. According to the rule of thumb, as the temperature rises by 10° C., the reaction rate is doubled. Therefore, the soap bar under ambient condition after about 1 year, can be estimated using such conditions. Normal fragrance ingredients have a tendency to evaporate due to higher volatility, whereas formula a) and formula b) and c) remain in soap bars and continually emanates. The result was a better fragrance cue in all stages using formula a) and formula b) and c). In particular, it was observed that soap bars comprising formula a) and formula b) and c) were still blooming even after 18 hours in the cabin. This indicates an oxidative slow release of the remaining perfume, which remained in the cabin after washing.

TABLE 6

Results of the evaluation with fragrance B at different wash stages
Sample kept at 45° C. after 3 month of making the batch-Olfactive comments

| Options | Dry soap bar | Lathering | Post Wash | Cabin Bloom 4 hours | Cabin Bloom after 18 hours |
|---|---|---|---|---|---|
| Fragrance B | Pass stability condition | Pleasant floral fruity note | Pleasant floral fruity note | Negligible | Negligible |
| B1 (Fragrance B + 1.25% profragrance of Formula a) + 1.25% profragrance of Formula b) and c)) | Better than control | Slightly Better than control | Slightly Better than control | Faint sweat Fruity note | Faint sweat Fruity note |

TABLE 6-continued

Results of the evaluation with fragrance B at different wash stages
Sample kept at 45° C. after 3 month of making the batch-Olfactive comments

| Options | Dry soap bar | Lathering | Post Wash | Cabin Bloom 4 hours | Cabin Bloom after 18 hours |
|---|---|---|---|---|---|
| B2 (Fragrance B +2 .5% profragrance of formula a)) | Distinct Fruity sweet note better than control | Better than control | Better than control | Sweat fruity note reminiscent of delta-damascone | Sweat fruity note reminiscent of delta-damascone |
| B3 (Fragrance B + 2.5% profragrance of Formula b) and c)) | Distinct floral, fruity, woody note better than Control | Better than control | Better than control | Floral Fruity, woody note | Floral Fruity woody note |

As shown above, though Fragrance B passed stability condition of dry bar soap evaluation at 45° C. after 3 Months, better fragrance cue was noticed in all options with profragrance. Floral, fruity woody note was enhanced in the lathering and post wash stages, giving better fragrance perception. While checking the cabin bloom after 4 and 18 hours, Fragrance B had negligible cabin bloom effect whereas all other profragrance options had significantly better floral fruity cue.

Fragrance C

Fragrance C1 (Table 7+1% Profragrance of Formula a))

TABLE 7

Table 7 provides a summary of the category of components of the Fragrance C.

| Category | Quantity |
|---|---|
| Aldehydic | 356.01 |
| Ambery | 60.00 |
| Animalic | 114.00 |
| Apple | 224.00 |
| Apricot | 36.12 |
| Balsamic | 14.00 |
| Bergamot | 200.00 |
| Blackcurrant | 16.00 |
| Cedar Wood | 240.00 |
| Citrus | 60.00 |
| Coconut | 16.00 |
| Floral | 1904.99 |
| Freesia | 635.00 |
| Fruity | 709.10 |
| Galbanum | 40.00 |
| Geranium | 40.01 |
| Grass | 12.00 |
| Green | 64.00 |
| Hay | 140.00 |
| Heliotrope | 40.00 |
| Herbal | 70.00 |
| Lactonic Fruits | 120.00 |
| Lily of the Valley | 185.50 |
| Melon | 10.00 |
| Musky | 110.00 |
| Orange Flower | 14.00 |
| Ozone | 30.00 |

TABLE 7-continued

Table 7 provides a summary of the category of components of the Fragrance C.

| Category | Quantity |
|---|---|
| Patchouli | 30.00 |
| Pear | 40.00 |
| Plum | 100.00 |
| Powdery | 26.00 |
| Raspberry | 20.60 |
| Rhubarb | 120.00 |
| Rose | 237.00 |
| Sandalwood | 20.00 |
| Spicy | 10.00 |
| Violet | 140.00 |
| Violet Leaf | 36.00 |
| Watery | 41.40 |
| Woody | 24.00 |
| Ylang | 10.00 |
| Total | 6315.72 |

Olfactive Descriptors of the Fragrance:

Floral, fruity, powdery, woody, aldehydic, and musky.

A significant improvement of the fragrance intensity and on stability was observed with the composition comprising profragrance of formula a) in comparison to control as shown below. The effect on stability of the fragrance was also more pronounced at lower dosages than in previous examples. Soap bars were kept at 45° C. for 3 months to mimic shelf life condition on the market and then the soap bars were olfactively evaluated at wash stages.

TABLE 8

Results of the evaluation with fragrance c at different wash stages Sample kept at 45° C. after 3 months of making the batch-Olfactive comments (Same Wash protocol followed as mentioned in Fragrance A)

| Options | dry soap bar | Lathering | Post Wash | Overall comments |
|---|---|---|---|---|
| Fragrance C | Pass stability condition | Aldehydic, floral fruity | Aldehydic, floral fruity | |
| C1-(Fragrance C + 1.0% profragrance of Formula a)) | Better fragrance cue than control | Better Cue for Aldehydic, Floral fruity, Musky | Better Cue for Aldehydic, Floral fruity, Musky | Slightly better fragrance cue for all the stages observed |

As shown above, though Fragrance C passed stability condition of dry bar soap on keeping at 45° C. for 3 months, better fragrance cue was noticed with 1.0% profragrance a) in formula. In the lathering and post wash stages, aldehydic, floral, fruity Musky note was enhanced, giving better fragrance cue.

Fragrance D

Fragrance D1 (Table 9+0.05% Profragrance of Formula a))

TABLE 9

Table 9 provides a summary of the category of components of the Fragrance D.

| Category | Quantity |
|---|---|
| Aldehydic | 75 |
| Animalic | 20 |
| Apple | 22 |
| Citrus | 240 |
| Floral | 72 |
| Freesia | 145 |
| Fruity | 125 |
| Galbanum | 15 |
| Geranium | 3 |
| Green | 8 |
| Herbal | 12 |
| Lily of the Valley | 50 |

TABLE 9-continued

Table 9 provides a summary of the category of components of the Fragrance D.

| Category | Quantity |
|---|---|
| Oak Moss | 2 |
| Pine | 75 |
| Rhubarb | 50 |
| Rose | 4 |
| Sulphuric | 10 |
| Thyme | 9 |
| Verbena | 90 |
| Total | 1027 |

Olfactive Descriptors:

Citrus, fruity, lemon, floral, orange, and green.

Significant improvement of the fragrance intensity and on the stability of the fragrance (Table 10 as shown below) was observed using 0.05 wt % profragrance of formula a) in the fragrance composition in comparison to a control. The effect got more pronounced on stability at 0.05 wt % profragrance of formula a) of the fragrance composition than examples above. The soap bars were kept at 50° C. for 14 days to mimic the soap condition approximately after 2 months at market shelf. The soap bars were compared with a control sample not comprising the formula a).

TABLE 10

Results of the evaluation with fragrance D at different wash stages Performance comparison-Olfactive comments (Same Wash protocol followed as mentioned in Fragrance A)

| Options | Dry soap bar (after 5 days) | Post Wash (after 5 days) | Dry bar kept at 50° C. (after 14 days) | Overall comments |
|---|---|---|---|---|
| Fragrance D | Citrus, Floral, fruity | Citrus, Floral, fruity, Green | Citrus, Floral, fruity note subdued | |
| D1-(Fragrance D + 0.05% profragrance of Formula a)) | Better Body with Citrus, Floral, fruity note | Sharper Fragrance cue than Fragrance D | Sharper Citrus, Floral, fruity note than Fragrance D | Better fragrance cue for all the stages observed |

Even with very low dosage of profragrance formula a) comprised in fragrance D, the olfactive characteristics of the dry soap bar can be described as having a bigger body/volume. Therefore, in wash stages a sharper Citrus, floral fruity green signal was noticed. When evaluated at 50° C. after 14 days, the dry soap bar with profragrance a) shown better fragrance characteristics such as enhanced fragrance intensity and a bigger volume.

Conclusions

Summary of all evaluation: Fragrance with different olfactive directions were tested with and without profragrance of formula a) and/or profragrance of formula b) and c). The samples with formula a) and/or formula b) and c) showed a significant improved olfactive effect than the control fragrances without such profragrances on each of the dry soap bar, in the wash stages and in the cabin bloom. The sample with profragrance of formula a) and profragrance of formula b) and c) also showed continuous release of delta-damascone and alpha- and beta-ionone mixture when evaluated analytically in an interval of 1, 2 and 3 month. Therefore, it can be concluded that the effect of the fragrances was enhanced by continuous release of delta-damascone and ionone in presence of atmospheric oxygen.

All the experiments showed that the addition of different amounts of formula a) and/or formula b) and c) enhanced the performance of the soap fragrance and in all stages of the use of the soap composition.

Example 5: Evaluation of a Soap Bar a. Fragrance

TABLE 11

Composition of fragrance E (no profragrances) and fragrance E1 (With Profragrance of Formula a))

| Fragrance compound | Quantity Perfume E1 | Quantity Perfume E1 |
|---|---|---|
| benzyl acetate | 3 | 3 |
| 3,7-dimethyl-6-octenyl acetate | 0.5 | 0.5 |
| 1,7,7-trimethyl-bicyclo[2.2.1]hept-2-yl acetate | 2 | 2 |
| 4-methoxybenzaldehyde | 1 | 1 |
| octanal | 0.5 | 0.5 |
| decanal | 4 | 4 |
| dodecanal | 2 | 2 |
| 2-benzylideneoctanal | 2 | 2 |
| aldehyde mna | 2 | 2 |
| allyl (2/3-methylbutoxy)acetate | 1 | 1 |
| 5-heptyldihydro-2 (3h)-furanone | 2 | 2 |
| 5-isopropenyl-2-methyl-2-cyclohexen-1-on | 1 | 1 |
| cedarwood oil | 2 | 2 |
| 3,7-dimethyl-2,6-octadienal | 1 | 1 |
| 3,7-dimethyl-6-octenenitrile | 3 | 3 |
| tricyclo[5.2.1.0(2,6)]dec-3/4-en-8-yl acetate | 5 | 5 |
| tricyclo[5.2.1.0(2,6)]dec-3/4-en-8-yl propanoate | 3 | 3 |
| 2,6-dimethyl-7-octen-2-ol | 10 | 10 |
| dipropylene glycol | 12 | 4 |
| 4-tert-butyl-1-cyclohexyl acetate | 9 | 9 |
| eucalyptus oil | 1 | 1 |
| 3,7-dimethyl-2,6-octadien-1-ol | 5 | 5 |

TABLE 11-continued

Composition of fragrance E (no profragrances) and fragrance E1 (With Profragrance of Formula a))

| Fragrance compound | Quantity Perfume E1 | Quantity Perfume E1 |
|---|---|---|
| 1-(octahydro-2,3,8,8-tetramethyl-2-naphtalenyl)-1-ethanone | 5 | 5 |
| (+-)-(3e)-3-methyl-4-(2,6,6-trimethyl-2-cyclohexen-1-yl)-3-buten-2-one and (+-)-(1e)-1-(2,6,6-trimethyl-2-cyclohexen-1-yl)-1-penten-3-one (b) | 1.5 | 1.5 |
| 3,7-dimethyl-1,6-octadien-3-ol | 2 | 2 |
| methyl [3-oxo-2-pentylcyclopentyl]acetate | 1.5 | 1.5 |
| orange oil | 1 | 1 |
| 4-isopropylidene-1-methylcyclohexene | 8 | 8 |
| 3-(dodecylthio)-1-[2,6,6-trimethyl-3-cyclohexen-1-yl]-1-butanone | 0 | 8 |
| triethanolamine | 4 | 4 |
| 4-(2,6,6-trimethyl-1-cyclohexen-1-yl)-3-buten-2-one | 3 | 3 |
| 2-methoxynaphthalene | 0.5 | 0.5 |
| 2,4-dimethyl-3-cyclohexene-1-carbaldehyde | 1.5 | 1.5 |
| Total | 100 | 100 |

b. Olfactive Evaluation of the Release of a Perfumery Composition Incorporated into a Laundry Bar—Synthetic Detergent Laundry Bar (Syndet)

Formulation

TABLE 12 composition of synthetic detergent laundry bar (syndet) formulations 1 and 2

| | Synthetic Detergent Laundry Bar (Syndet) | |
|---|---|---|
| Ingredients | Formulation 1 (%) | Formulation 2 (%) |
| Surfactants | | |
| Sodium Linear Alkyl Benzene Solfonate | 10 to 20 | 10 to 20 |
| Soap | | |
| Alpha Olefin Sulfonate (AOS) | | |
| sodium lauryl sulfate | | |
| Builders | | |
| Sodium Carbonate | 5 to 15 | 5 to 15 |
| Sodium Tri Polyphospate | | 5 to 15 |
| Zeolite | | 5 to 15 |
| Fillers | | |
| Sodium Sulphate | 5 to 30 | 5 to 30 |
| Talc | 5 to 30 | 5 to 30 |
| Dolamite-CaMg $(CO_3)_2$ | 5 to 50 | 5 to 50 |

TABLE 12-continued composition of synthetic detergent laundry bar (syndet) formulations 1 and 2

| Ingredients | Synthetic Detergent Laundry Bar (Syndet) Formulation 1 (%) | Formulation 2 (%) |
|---|---|---|
| China Clay | 5 to 50 | 5 to 50 |
| Calcite-Calcium Carbonate | | |
| Sodium Chloride | 5 to 20 | 5 to 20 |
| Structuring Ingredients | | |
| Aluminium Sulphate | 0.5 to 5 | 0.5 to 5 |
| Alkaline Silicate | 1 to 5 | 1 to 5 |
| Others | | |
| Colour | 0.1 to 1 | 0.1 to 1 |
| Perfume A or B | 0.1 to 1 | 0.1 to 1 |
| Moisture | 5 to 15 | 5 to 15 |

Evaluation Protocol

Sample Preparation 36 terry facial towels were soaked in water wringed by hand. Soap bars were rubbed 20 times on each wet terry facial towels. Each towel was rubbed 20 times in 20 L of water. All the towels were rinsed once in 40 L of water.

The towels were line dried in an odor free environment. One set of towels was evaluated by two panelists.

Results

TABLE 13

Olfactive evaluation results for synthetic detergent laundry bar (syndet) formulations 1 and 2 of the present invention

| | Formulation 1 | | Formulation 2 | |
|---|---|---|---|---|
| | Dry 3 days | Dry 5 days | Dry 3 days | Dry 5 days |
| Perfume E (no profragrances) | 1.75 | 1.0 | 1.5 | 1 |
| Perfume E1 (with profragrance of formula a)) | 3.75 | 3.00 | 3.5 | 3.0 |

Conclusion

Olfactive evaluation done on dry fabrics (Terry Facial Towles) after 3 days and 5 days—those washed with laundry soap containing Perfume B (with Profragrance of formula a)) performs much better and have a much stronger perfume intensity than those washed with laundry soap containing Perfume E (without profragrance). From 3 days to 5 days the perfume intensity on fabrics for Perfume E decreases but for Perfume E1 it remains the same on Day 3 and Day 5 which further increases the olfactive difference between Perfume E and Perfume E1, Perfume E1 being much more stronger.

c. Fragrance Long Lastingness in Laundry Bar Over Product Usage Life Cycle

Formulation

The formulation for tests in fragrance long lastingness in laundry bars over product usage life cycle are the same as in Example 5b above:

Perfume E (without Profragrance)

Perfume E1 (With Profragrance of formula a))

Laundry Bar—Formulation 1

Evaluation Protocol

Both the Laundry bars were rub 100 times on terry facial towel each day and then experts smelled and rated the perfume intensity on used laundry bars on scale of 0 to 5 (0 been lowest and 5 been highest). The same process was been repeated for 5 days and expert evaluated the strength of fragrance on used Laundry bar for each all 5 days Results

TABLE 14 fragrance long lastingness results for synthetic detergent laundry bar (syndet) formulations 1 and 2 of the present invention

| | Day 1 | Day 2 | Day 3 | Day 4 | Day 5 |
|---|---|---|---|---|---|
| Perfume E (no profragrances) | 5 | 4 | 3 | 2 | 1 |
| Perfume E1 (with profragrance of formula a)) | 5.1 | 4.75 | 4 | 3 | 2 |

Conclusion

The study shows that the Laundry Bar with Perfume E1 (with Profragrance of formula a)) shows increased olfactive intensity and a more lasting perfume performance than Laundry Bar with Perfume E (without Profragrance) over there usage life cycle of the laundry soap—Day 2, Day 3, Day 4 and Day 5 d. Stability Evaluation

Formulation

The formulations for stability evaluation are the same as in Example 5b above.

Perfume E (without Profragrance)

Perfume E (With Profragrance of formula a))

Laundry Bar—Formulation 1

Evaluation Protocol

Laundry Bars made with Perfume E and Perfume E1 were kept on stability studies at the following conditions:—

Storage conditions:—Cold (4° C.) (Col), Room Temperature (22° C.) (RT), Hot & Dry (45° C. and 40% Relative Humidity) (HD), Hot & Humid (40° C. and 85% Relative Humidity) (HH).

Evaluation of perfume intensity on Laundry Bar after stability study and on washed 3 days & 5 days dry Fabrics. Perfume intensity scale from 0 (no odour) to 5 (very strong odour). The washing and drying protocol is the same as in Example 5c above.

Results

TABLE 15

| Olfactive Evaluation on Laundry Bar after stability study | | | | | | | | | | | | | | | | |
|---|---|---|---|---|---|---|---|---|---|---|---|---|---|---|---|---|
| | Day 0 | | | | 1 Month | | | | 2 Month | | | | 3 Month | | | |
| Options | Cold | RT | HH | HD | Cold | RT | HH | HD | Cold | RT | HH | HD | Cold | RT | HH | HD |
| Perfume E | 5 | 5 | 5 | 5 | 5 | 4.5 | 4.5 | 4.5 | 4.5 | 4.0 | 3.75 | 3.75 | 4 | 3.5 | 3 | 3 |
| Perfume E1 | 5 | 5 | 5 | 5 | 5 | 5 | 5 | 5 | 4.5 | 4.5 | 4.25 | 4.25 | 4.5 | 4.25 | 4.25 | 4.25 |

TABLE 16

| Olfactive Evaluation on washed Dry Fabrics (3 days & 5 days) using Laundry soap bars which have been stored for 1 month, 2 months and 3 months at Hot & Humid (40° C. & 85% Relative Humidity) | | | | | | | | |
|---|---|---|---|---|---|---|---|---|
| | Day 0 | | 1 Month | | 2 Month | | 3 Month | |
| Options | 3 Days | 5 Days | 3 Days | 5 Days | 3 Days | 5 Days | 3 Days | 5 Days |
| Perfume E | 2.5 | 2 | 2 | 1 | 1.5 | 1 | 1.25 | 0.75 |
| Perfume E1 | 4.5 | 4.5 | 4.5 | 4.5 | 4 | 4 | 3.75 | 3.75 |

e. Conclusion

Olfactive Evaluation on Laundry Bar after stability study—From the above table it can be seen that laundry bars with Perfume E (with profragrance of formula a)) shows a much stronger olfactive impact on neat laundry soap bar after storage (suggesting better perfume retention) as compare to laundry soap bars with Perfume E (no profragrances) on stability study across all different stability conditions (particularly at room temperature, hot & humid, hot & dry)

Olfactive Evaluation on Washed Dry Fabrics (3 days & 5 days) using Laundry soap bars which have been stored for 1 month, 2 months and 3 months at Hot & Humid (40 deg C. & 85% Relative Humidity)—From the above table it can be seen that terry towels washed with laundry bars with Perfume E1 show higher level of perfume intensity at 3 days and 5 days across all the samples as compared to towels washed laundry bars with Perfume E (no profragrances)

Example 6: Olfactive Evaluation of the Release of a Perfumery Composition Incorporated into a Laundry Bar—Laundry Soap Bar (Formulation 3) & Laundry Soap Syndet Bar (Formulation 4)

a. Formulation

TABLE 17

| composition of soap formulation 3 and soap syndet formulation 4 | | |
|---|---|---|
| Ingredients | Soap Formulation 3 (%) | Soap-Syndet Formulation 4 (%) |
| Surfactants | | |
| Sodium Linear Alkyl Benzene Solfonate | | |
| Soap | 10 to 25 | 5 to 15 |
| Alpha Olefin Sulfonate (AOS) | | 1 to 5 |
| sodium lauryl sulfate | | 1 to 5 |

TABLE 17-continued

| composition of soap formulation 3 and soap syndet formulation 4 | | |
|---|---|---|
| Ingredients | Soap Formulation 3 (%) | Soap-Syndet Formulation 4 (%) |
| Builders | | |
| Sodium Carbonate | 5 to 15 | 5 to 15 |
| Sodium Tri Polyphospate | | |
| Zeolite | | |
| Fillers | | |
| Sodium Sulphate | 5 to 30 | 5 to 30 |
| Talc | 5 to 30 | 5 to 30 |
| Dolamite | 5 to 50 | 5 to 50 |
| China Clay | 5 to 50 | 5 to 50 |
| Calcite-Calcium Carbonate | | |
| Sodium Cholride | 5 to 20 | 5 to 20 |
| Structuring Ingredients | | |
| Aluminium Sulphate | 0.5 to 5 | 0.5 to 5 |
| Alkaline Silicate | 1 to 5 | 1 to 5 |
| Others | | |
| Colour | 0.1 to 1 | 0.1 to 1 |
| Perfume E/E1 | 0.1 to 1 | 0.1 to 1 |
| Moisture | 5 to 15 | 5 to 15 |

Evaluation Protocol

Sample Preparation 36 terry facial towels were soaked in water wringed by hand. Bars were rubbed 20 times on each wet terry facial towels. Each towel was rubbed 20 times in 20 L of water. All the towels were rinsed once in 40 L of water.

The towels were line dried in an odor free environment. One set of towels was evaluated by two panelists.

Results

TABLE 18

Olfactive evaluation results for formulations 3 and 4 of the present invention

| | Formulation 3 | | Formulation 4 | |
|---|---|---|---|---|
| | Dry 3 days | Dry 5 days | Dry 3 days | Dry 5 days |
| Perfume E (no profragrances) | 1.5 | 1.0 | 1.5 | 1 |
| Perfume E1 (with profragrance of formula a)) | 3.5 | 2.75 | 3.5 | 3.0 |

Conclusion

Olfactive evaluation done on dry fabrics (Terry Facial Towles) after 3 days and 5 days—those washed with laundry soap containing Perfume B (with Profragrance of formula a)) performs much better and have a much stronger perfume intensity than those washed with laundry soap containing Perfume E (without profragrance). From 3 days to 5 days the perfume intensity on fabrics for Perfume E decreases but for Perfume E1 it remains the same on Day 3 and Day 5 which further increases the olfactive difference between Perfume E and Perfume E1, Perfume E1 being much more stronger.

b. Fragrance Long Lastingness in Laundry Bar Over Product Usage Life Cycle

Formulation

The formulations for fragrance long lastingness are the same as in Example 6a above Perfume E (without Profragrance)

Perfume E1 (With Profragrance of formula a))

Laundry Bar—Formulation 3

Evaluation Protocol

Both the Laundry bars were rub 100 times on terry facial towel each day and then experts smelled and rated the used laundry bars on scale of 0 to 5 (0 been lowest and 5 been highest)

The same process was been repeated for 5 days and expert evaluated the strength of fragrance on used Laundry bar for each all 5 days and expert evaluated the strength of fragrance on used Laundry bar for each all 5 days Results

TABLE 19

Test results on Fragrance long lastingness over product usage life cycle

| | Day 1 | Day 2 | Day 3 | Day 4 | Day 5 |
|---|---|---|---|---|---|
| Perfume E (no profragrances) | 4 | 3 | 2 | 1 | 1 |
| Perfume E1 (with profragrance of formula a)) | 4.5 | 4 | 3 | 2.5 | 2 |

Conclusion

The study clearly shows that the Laundry Bar with Perfume E1 (with Profragrance of formula a)) shows pursuable olfactive intensity and a more lasting perfume performance than Laundry Bar with Perfume E (without Profragrance) over there usage life cycle of the laundry soap—Day 2, Day 3, Day 4 & Day 5 c. Stability Evaluation

Formulation

The formulations for stability evaluation are the same as in Example 6a above

Perfume E (without Profragrance)

Perfume E1 (With Profragrance of formula a))

Laundry Soap Bar—Formulation 3

Evaluation Protocol

Laundry Bars made with Perfume E and Perfume E1 were kept on stability studies at the following conditions:—

Storage conditions: Cold (4° C.) (Col), Room Temperature (22° C.) (RT), Hot & Dry (45° C. & 40% Relative Humidity) (HD), Hot & Humid (40° C. & 85% Relative Humidity) (HH)

Evaluation Time:—Day 0, 1 month, 2 months & 3 months

Evaluation on Laundry Bar after stability study and on washed 3 days and 5 days dry Fabrics. Perfume intensity scale from 0 (no odour) to 5 (very strong odour). Wash & drying protocol as in prior example Results

TABLE 20

Olfactive Evaluation on Laundry Soap Bar after stability study

| | Day 0 | | | | 1 Month | | | | 2 Month | | | | 3 Month | | | |
|---|---|---|---|---|---|---|---|---|---|---|---|---|---|---|---|---|
| Options | Cold | RT | HH | HD | Cold | RT | HH | HD | Cold | RT | HH | HD | Cold | RT | HH | HD |
| Perfume E | 5 | 5 | 5 | 5 | 4.5 | 4 | 4 | 4 | 4 | 3.5 | 3.5 | 3.5 | 4 | 3 | 3 | 3 |
| Perfume E1 | 5 | 5 | 5 | 5 | 5 | 4.5 | 4.5 | 4.5 | 4.5 | 4.5 | 4 | 4 | 4.5 | 4 | 4 | 4 |

TABLE 21

| Olfactive Evaluation on washed Dry Fabrics (3 days & 5 days) using Laundry soap bars which have been stored for 1 month, 2 months and 3 months at Hot & Humid (40° C. & 85% Relative Humidity) | | | | | | | | |
|---|---|---|---|---|---|---|---|---|
| | Day 0 | | 1 Month | | 2 Month | | 3 Month | |
| Options | 3 Days | 5 Days | 3 Days | 5 Days | 3 Days | 5 Days | 3 Days | 5 Days |
| Perfume E | 2 | 2 | 1.75 | 1.5 | 1 | 1 | 1 | 0.75 |
| Perfume E1 | 4 | 4 | 3.75 | 3.75 | 3 | 3 | 3 | 3 |

d. Conclusion

Olfactive Evaluation on Laundry Bar after stability study—From the above table it can be seen that laundry soap bars with Perfume E1 (with profragrances of formula a)) show a much stronger olfactive impact on neat laundry soap bar after storage (suggesting better perfume retention) as compare to laundry soap bars with Perfume E (no profragrances) on stability study across all different stability conditions Olfactive Evaluation on Washed Dry Fabrics (3 days & 5 days) using Laundry soap bars which have been stored for 1 month, 2 months and 3 months at Hot & Humid (40° C. & 85% Relative Humidity)

From the above table it can be seen that terry towels washed with laundry soap bars with Perfume E1 show higher level of perfume intensity at 3 days and 5 days across all the samples as compared to towels washed laundry soap bars with Perfume E (no profragrances)

The invention claimed is:

1. A soap composition comprising a soap active material comprising a sodium salt of a fatty acid in an amount of 40-92 wt % based on the soap composition; and a fragrance composition comprising at least one profragrance compound, wherein the at least one profragrance compound releases a fragrance compound upon reacting with oxygen;

wherein the profragrance compound is selected from the group consisting of a)

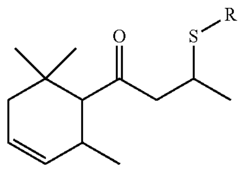

b)

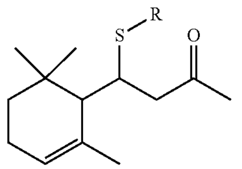

c)

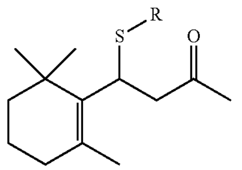

-continued d)

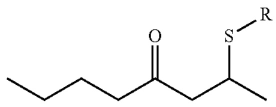

wherein R represents a $C_1$-$C_{20}$ alkyl or alkenyl.

2. The soap composition according to claim 1, wherein the fragrance composition is present in an amount of from 0.01 to 10 wt %, based on a total weight of the soap composition.

3. The soap composition according to claim 1, wherein the profragrance compound is present in an amount of from 0.000001 to 1 wt %, based on a total weight of the soap composition.

4. The soap composition according to claim 1, further comprising a filler.

5. The soap composition according to claim 4, wherein the filler is one or more compounds selected from the group consisting of $TiO_2$, talc, sodium sulphate, sodium carbonate, sodium phosphate and sugar.

6. A soap article comprising a soap composition according to claim 1.

7. The soap article according to claim 6, in a form of a liquid cleanser, a toilet bar, a laundry bar, a shaving composition, a personal cleansing composition, a body care product, or a shampoo.

8. A method for conferring, improving, enhancing or modifying fragrance intensity of a fragrance composition on a skin surface or in air surrounding the skin, a surface or a soap article over a prolonged period of time, under ambient conditions, wherein the method comprises a step of applying a soap composition according to claim 1 to the skin, the surface or air.

9. A method of conferring, improving, enhancing or modifying perfume retention of a fragrance composition over a prolonged period of time, in a soap composition or a soap article during storage, wherein the method comprises a step of incorporating a profragrance according to claim 1 in the soap composition or the soap article.

10. A method for conferring, improving, enhancing or modifying fragrance intensity of a fragrance composition on a skin surface or in air surrounding the skin, a surface or a soap article over a period of time of 48 hours, under ambient conditions, wherein the method comprises a step of applying a soap composition according to claim 1 to the skin, the surface or air.

11. A method of conferring, improving, enhancing or modifying perfume retention of a fragrance composition over a period of time of 18 months, in a soap composition or a soap article during storage, wherein the method comprises a step of incorporating a profragrance according to claim 1 in the soap composition or the soap article.

12. The soap composition according to claim 1, wherein the profragrance compound is selected from the group consisting of a)

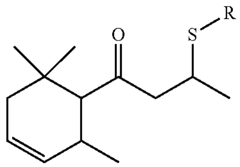

b)

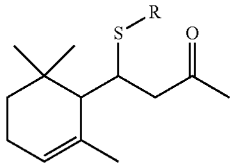

c)

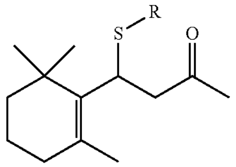

-continued d)

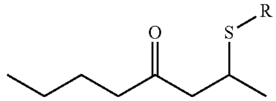

wherein R represents a $C_6$-$C_{15}$ alkyl or alkenyl.

13. The soap composition according to claim 1, wherein the fragrance composition is present in an amount of from 0.1 to 3 wt %, based on a total weight of the soap composition.

14. The soap composition according to claim 1, wherein the profragrance compound is present in an amount of from 0.00001 to 0.1 wt %, based on a total weight of the soap composition.

15. The soap composition according to claim 1, further comprising a filler, wherein the filler is present in an amount of from 0.002 to 35 wt %.

16. The soap article according to claim 6, in a form of a liquid cleanser, a toilet bar, a soap-based or syndet-based laundry bar, a shaving composition, a personal cleansing composition, a body care product, or a shower gel.

* * * * *